US011729031B2

(12) United States Patent
Wang et al.

(10) Patent No.: US 11,729,031 B2
(45) Date of Patent: Aug. 15, 2023

(54) SYSTEMS AND METHODS FOR SELECTING SUBCARRIERS FOR SUB-PRB TRANSMISSIONS

(71) Applicant: Telefonaktiebolaget LM Ericsson (publ), Stockholm (SE)

(72) Inventors: Yi-Pin Eric Wang, Fremont, CA (US); Anders K. Eriksson, Uppsala (SE); Johan Bergman, Stockholm (SE); Chunhui Zhang, Stockholm (SE); Gerardo Agni Medina Acosta, Märsta (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 17/863,465

(22) Filed: Jul. 13, 2022

(65) Prior Publication Data
US 2022/0353118 A1 Nov. 3, 2022

Related U.S. Application Data

(63) Continuation of application No. 16/341,441, filed as application No. PCT/IB2018/058509 on Oct. 30, 2018, now Pat. No. 11,418,374.
(Continued)

(51) Int. Cl.
*H04L 27/20* (2006.01)
*H04L 27/26* (2006.01)
*H04L 5/00* (2006.01)

(52) U.S. Cl.
CPC .......... *H04L 27/20* (2013.01); *H04L 5/0044* (2013.01); *H04L 5/0051* (2013.01); *H04L 27/26025* (2021.01)

(58) Field of Classification Search
CPC ..... H04L 27/20; H04L 5/0044; H04L 5/0051; H04L 27/26025; H04L 5/003
See application file for complete search history.

(56) References Cited

U.S. PATENT DOCUMENTS

| 2013/0114756 A1 | 5/2013 | Jia et al. |
| 2016/0006548 A1 | 1/2016 | Yang et al. |
| (Continued) | | |

FOREIGN PATENT DOCUMENTS

| EP | 2978151 A1 | 1/2016 |
| JP | 2012005073 A | 1/2012 |
| (Continued) | | |

OTHER PUBLICATIONS

Author Unknown, "Technical Specification Group Radio Access Network; Evolved Universal Terrestrial Radio Access (E-UTRA); Physical channels and modulation (Release 15)," Technical Specification 36.211, Version 15.2.0, Jun. 2018, 3GPP Organizational Partners, 236 pages.
(Continued)

*Primary Examiner* — Khanh C Tran
(74) *Attorney, Agent, or Firm* — Withrow & Terranova, PLLC

(57) ABSTRACT

Systems and methods for selecting subcarriers to be used for sub-Physical Resource Block (PRB) transmission and, in some embodiments, for mapping Demodulation Reference Signals (DMRS) to resources on the selected subcarriers are disclosed. In some embodiments, a method of operation of a radio node for providing sub-PRB transmission comprises selecting two adjacent subcarriers from a set of three allocated subcarriers that are allocated for a sub-PRB transmission that uses Single Carrier Frequency Division Multiple Access (SC-FDMA) Pi/2 Binary Phase Shift Keying (BPSK) modulation using only two adjacent subcarriers out of the set of three allocated subcarriers with Discrete Fourier
(Continued)

Transform (DFT) spread length of 2. In some embodiments, the selection is such that the selected adjacent subcarriers varies, e.g., from one cell to another. In doing so, interference is distributed.

20 Claims, 15 Drawing Sheets

Related U.S. Application Data

(60) Provisional application No. 62/625,185, filed on Feb. 1, 2018.

(56) References Cited

U.S. PATENT DOCUMENTS

| | | | |
|---|---|---|---|
| 2017/0187499 | A1 | 6/2017 | Hwang et al. |
| 2017/0201989 | A1 | 7/2017 | Fakoorian et al. |
| 2019/0215849 | A1* | 7/2019 | Ye .................. H04L 5/0053 |
| 2019/0222457 | A1* | 7/2019 | Wei .............. H04L 27/2614 |
| 2020/0068608 | A1* | 2/2020 | Ye .................. H04W 72/048 |
| 2021/0022189 | A1* | 1/2021 | Beale ............. H04W 74/006 |

FOREIGN PATENT DOCUMENTS

| | | |
|---|---|---|
| TW | 201728113 A | 8/2017 |
| WO | 2017119931 A1 | 7/2017 |
| WO | 2017123352 A1 | 7/2017 |
| WO | 2019077496 A1 | 4/2019 |

OTHER PUBLICATIONS

Author Unknown, "Technical Specification Group Radio Access Network; Evolved Universal Terrestrial Radio Access (E-UTRA); Physical layer procedures (Release 15)," Technical Specification 36.213, Version 15.2.0, Jun. 2018, 3GPP Organizational Partners, 541 pages.
Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.0.1, Jan. 2018, 3GPP Organizational Partners, 776 pages.
Author Unknown, "RAN1 Chairman's Notes" 3GPP TSG RAN WG1 Meeting #95, Nov. 12-16, 2018, Spokane, Washington, 128 pages.
Ericsson, "R1-1712987: Increased PUSCH spectral efficiency for MTC," 3GPP TSG-RAN WG1 Meeting #90, Aug. 21-25, 2017, Prague, Czech Republic, 7 pages.
Ericsson, "R1-1719354: Increased PUSCH spectral efficiency for MTC," 3GPP TSG-RAN WG1 Meeting #91, Nov. 27-Dec. 1, 2017, 18 pages.
Ericsson et al., "RP-171427: Revised WID on Even further enhanced MTC for LTE," 3GPP TSG RAN Meeting #76, Jun. 5-8, 2017, West Palm Beach, Florida, 4 pages.
ETSI MCC, "RP-171409: Report of 3GPP TSG RAN meeting #75," 3GPP TSG RAN meeting #76, Jun. 5-8, 2017, West Palm Beach, Florida, 189 pages.
Huawei et al., "RP-170309: Revised WID: LTE Advanced interband CA Rel-14 for 3DL/1UL", 3GPP TSG RAN Meeting #75, Mar. 6-9, 2017, Dubrovnik, Croatia, 38 pages.
Nokia et al., "R1-1720131: Design of PUSCH Sub-PRB Allocation", 3GPP TSG RAN WG1 Meeting #91, Nov. 27-Dec. 1, 2017, Reno, Nevada, 6 pages.
NTT Docomo, Inc., "R1-721237: Chairman's notes of AI 6.2.5 even further enhanced MTC for LTE," 3GPP TSG RAN WG1 Meeting 91, Nov. 27-Dec. 1, 2017, Reno, Nevada, 5 pages.
Sierra Wireless, "R1-1720155: Sub-PRB Design Analysis," 3GPP TSG RAN WG1 Meeting 91, Nov. 27-Dec. 1, 2017, Reno, Nevada, 10 pages.
Sierra Wireless, "R1-1806000: Remaining Issues for PUSCH Sub-PRB Allocation," 3GPP TSG RAN WG1 Meeting #93, May 21-25, 2018, Busan, Korea, 10 pages.
Sony, "R1-1718266: Sub-PRB transmissions in efeMTC for improved PUSCH spectral efficiency", 3GPP TSG RAN WG1 Meeting #90, , Aug. 9-13, 2017, Prague, Czech Republic, 5 pages.
TSG RAN WG1, "R4-1714423: LS on PUSCH sub-PRB allocation Rel-15 LTE-MTC", 3GPP TSG RAN WG4 Meeting #85, Nov. 27-Dec. 1, 2017, Reno, Nevada, 1 page.
TSG RAN WG1, "R1-1721283: LS on PUSCH sub-PRB allocation Rel-15 LTE-MTC," 3GPP TSG-RAN WG1 Meeting #91, Nov. 27-Dec. 1, 2017, Reno, Nevada, 1 page.
Intention to Grant for European Patent Application No. 18808113.7, dated Feb. 15, 2022, 5 pages.
Notice of Reasons for Refusal for Japanese Patent Application No. 2020-537655, dated Oct. 25, 2021, 7 pages.
International Search Report and Written Opinion for International Patent Application No. PCT/IB2018/058509, dated Jan. 30, 2019, 9 pages.
International Preliminary Report on Patentability for International Patent Application No. PCT/IB2018/058509, dated Apr. 9, 2020, 13 pages.
Non-Final Office Action for U.S. Appl. No. 16/341,441, dated Dec. 8, 2021, 12 pages.
Notice of Allowance for U.S. Appl. No. 16/341,441, dated Apr. 14, 2022, 9 pages.
Sierra Wireless, et al., "R1-1721267: WF on Sub-PRB Subcarriers and Modulation Option1," 3GPP TSG RAN WG1 Meeting #91, Nov. 27-Dec. 1, 2017, Reno, Nevada, 3 pages.
Office Action for Chinese Patent Application No. 201880088164.0, dated Sep. 7, 2022, 7 pages.
Extended European Search Report for European Patent Application No. 22184149.7, dated Sep. 20, 2022, 9 pages.
Notice of Reasons for Refusal for Japanese Patent Application No. 2022-079676, dated Jun. 5, 2023, 6 pages.

* cited by examiner

Example of a subcarrier allocation consisting of 3 subcarriers when only two out of three are used, and where the RU length is 8 ms

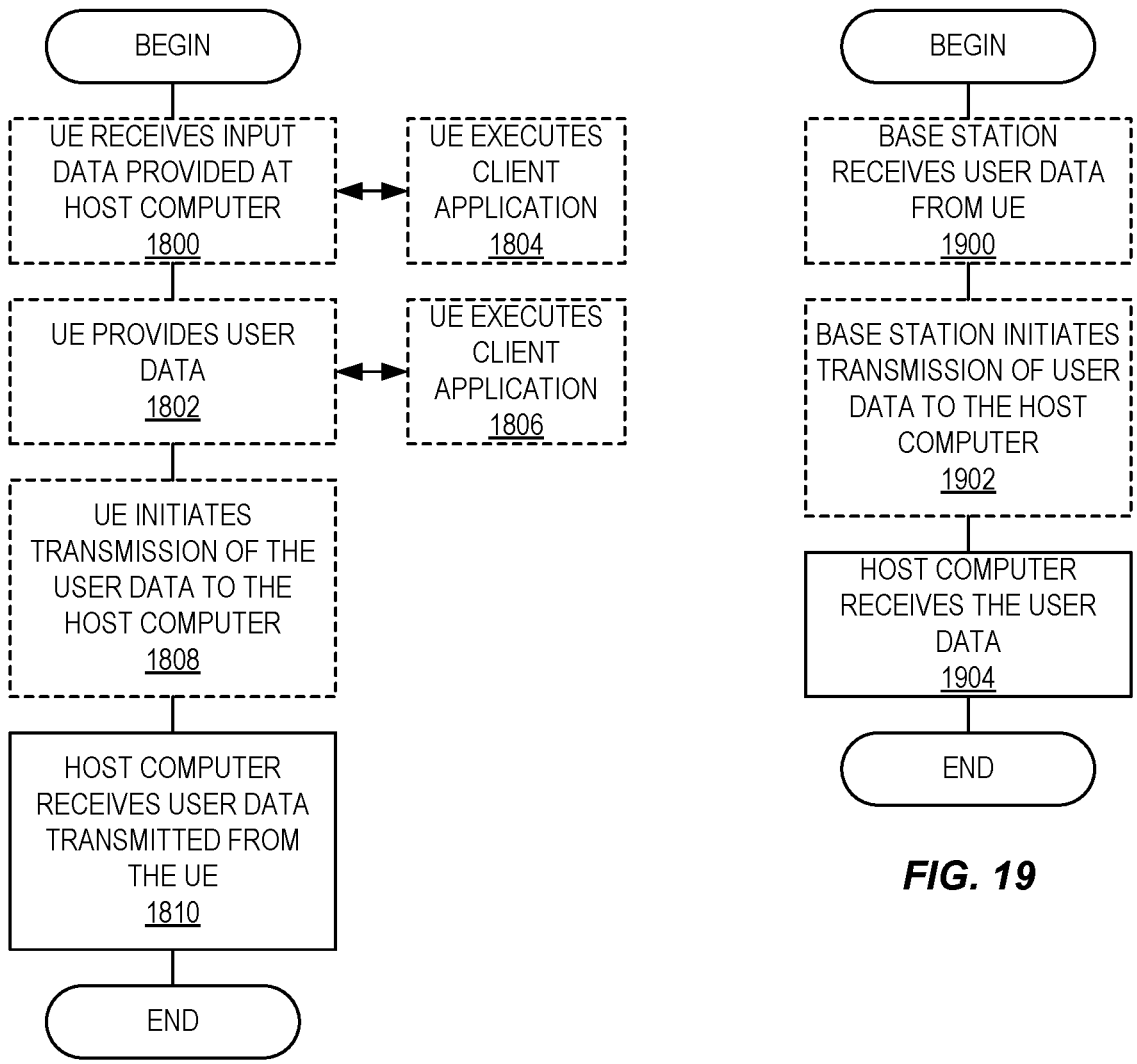

SYSTEMS AND METHODS FOR SELECTING SUBCARRIERS FOR SUB-PRB TRANSMISSIONS

RELATED APPLICATIONS

This application is a continuation of U.S. patent application Ser. No. 16/341,441, filed Apr. 11, 2019, now U.S. Pat. No. 11,418,374 B2, which is a national stage application of International Patent Application No. PCT/IB2018/058509, filed Oct. 30, 2018, which claims the benefit of provisional patent application Ser. No. 62/625,185, filed Feb. 1, 2018, the disclosures of which are hereby incorporated herein by reference in their entireties.

TECHNICAL FIELD

The present disclosure relates to sub-Physical Resource Block (PRB) transmissions in a wireless communication network.

BACKGROUND

At the Third Generation Partnership Project (3GPP) Radio Access Network (RAN) plenary #75, a new Work Item (WI) on Even Further Enhanced Machine Type Communication (efeMTC) for Long Term Evolution (LTE) was approved [1]. In accordance with the WI Description (WID) [2], one of the areas to be even further enhanced refers to increasing the Physical Uplink Shared Channel (PUSCH) spectral efficiency.

Increased PUSCH spectral efficiency [RAN1 lead, RAN2, RAN4]
E.g., sub-Physical Resource Block (PRB) resource allocation, with no less than 3 subcarriers within a sub-PRB allocation.

In RAN1 #88bis several companies provided preliminary simulation results and their view on which technique should be used for increasing the spectral efficiency of the PUSCH. In RAN1 #89, additional results using common simulation assumptions were discussed, as well as technical comparisons among the candidate techniques. In RAN1 #90, it was agreed to specify the sub-PRB technique to increase the PUSCH spectral efficiency, while in RAN1 #90bis companies started to discuss the basic design elements that should be part of the support of sub-PRB over PUSCH. Recently, in RAN1 #91, the number of subcarriers to be supported by the sub-PRB transmissions was agreed, together with their support for both Coverage Enhancement (CE) Mode A and B, and some other agreements.

As a technical background, the sub-PRB technique improves the spectral efficiency for User Equipment devices (UEs) that are coverage limited (not bandwidth limited) by increasing the subcarrier allocation granularity within a PRB made of 180 kilohertz (kHz). For example, by using the sub-PRB technique two Bandwidth Limited Low Complexity (BL)/CE devices can coexist within a PRB when each of them are allocated with 6 subcarriers, which represents to be a 100% spectral efficiency improvement. Similarly, four BL/CE devices could be allocated with 3 subcarriers each, leading to a 300% spectral efficiency improvement.

RAN1 has recently agreed that the sub-PRB transmissions will support three types of subcarrier allocation:
6 subcarriers with Single Carrier Frequency Division Multiple Access (SC-FDMA) Quadrature Phase Shift Keying (QPSK) modulation
3 subcarriers with SC-FDMA QPSK modulation
3 subcarriers with SC-FDMA Pi/2 Binary Phase Shift Keying (BPSK) modulation.

The first two allocations listed above have corresponding cases in another 3GPP technology, Narrowband Internet of Things (NB-IoT), whereas the third allocation is new compared to NB-IoT, which instead has a single-subcarrier case.

Reducing the resource utilization in the frequency domain is typically compensated by extending the resource utilization in the time domain. This principle has been adopted for the support of sub-PRB into PUSCH, where the fundamental transmission duration (i.e., Resource Unit (RU) length) is determined as a function of the number of allocated subcarriers. While the number of subcarriers for sub-PRB transmissions over PUSCH have been agreed to be 3 and 6, the exact RU lengths have not been determined yet.

In a regular PUSCH transmission over one PRB, a Transport Block (TB) is mapped over 12 subcarriers of 15 kHz each (i.e., 180 kHz) during 1 millisecond (ms) (since there are 14 SC-FDMA symbols in 1 ms, a total of 12×14=168 Resource Elements (REs) are occupied). In the sub-PRB transmissions, aiming at preserving the same number of REs that are usable in a full PRB allocation, the RU lengths for "6 subcarriers with SC-FDMA QPSK modulation" and "3 subcarriers with SC-FDMA QPSK modulation" should be equal to {2 ms, 4 ms} for {6, 3} subcarriers respectively.

On the other hand, for "3 subcarriers with SC-FDMA Pi/2 BPSK modulation," it has been decided that only two out of the three allocated subcarriers are used, therefore the number of usable REs decreases. On this matter, keeping the number of usable REs with respect to a conventional 3-subcarrier allocation unimpacted would require using a RU length equal to 6 ms. However, a RU length equal to 6 ms is not well suited to the maximum total number of (valid) subframes that will be used for the sub-PRB transmissions (i.e., 32 and 2048), and therefore the RU length in this case could instead be either 4 ms or 8 ms. A RU length equal to 4 ms is below the RU length that in principle is needed (i.e., 6 ms), and therefore a RU length equal to 8 ms would be a better choice (e.g., it will provide better code rates, thus it will allow to support larger TBs).

Moreover, for "3 subcarriers with SC-FDMA Pi/2 BPSK modulation" there is a set of agreements that define certain characteristics that this type of allocation shall have [3]:

---

Agreement:
• 3 subcarriers with SC-FDMA Pi/2 BPSK modulation
  • The Pi/2 rotation is performed across SC-FDMA symbols
  • Use only 2 adjacent subcarriers out of the 3 allocated subcarriers with DFT-spread of length 2
    • FFS: which 2 subcarriers out of the 3 allocated subcarriers are used
    • Working assumption: The 2 used subcarriers shall be fixed per cell in specification
      • FFS: semi-statically configured
    • FFS: Frequency hopping case

---

The allocation of "3 subcarriers with SC-FDMA Pi/2 BPSK modulation" was agreed to be supported for sub-PRB transmissions over PUSCH due to its ability of providing the same Peak-to-Average Power Ratio (PAPR) performance as transmission of a single subcarrier, also known as a single tone. For this to work, it is necessary to use two out of the three allocated subcarriers, so in the transceiver the output of the N-Fast Fourier Transform (FFT) converts the two-tone BPSK into a single-tone BPSK.

In other words, the legacy baseband LTE SC-FDMA transceiver chain remains essentially unchanged, meaning that the only change consists in "replacing" the QPSK module by a BPSK module. The high-level operation principle behind the usage of "3 subcarriers with SC-FDMA Pi/2 BPSK modulation" is illustrated below, where the number of utilized subcarriers N=2.

0 0→BPSK modulator→{1; 1}→N-FFT→{2; 0}→ . . .
0 1→BPSK modulator→{1; −1}→N-FFT→{0; 2}→ . . .
1 0→BPSK modulator→{−1; 1}→N-FFT→{0; −2}→ . . .
1 1→BPSK modulator→{−1; −1}→N-FFT→{−2; 0}→ . . .

From the illustration above it is possible to observe that "3 subcarriers with SC-FDMA Pi/2 BPSK modulation" in all cases provides as output of the N-FFT a single-tone baseband signal.

Once it has been described why "3 subcarriers with SC-FDMA Pi/2 BPSK modulation" uses "only 2 adjacent subcarriers out of the 3 allocated subcarriers with Discrete Fourier Transform (DFT) spread of length 2", there are other technical aspects that need to be resolved.

SUMMARY

Systems and methods for selecting subcarriers to be used for sub-Physical Resource Block (PRB) transmission and, in some embodiments, for mapping Demodulation Reference Signals (DMRSs) to resources on the selected subcarriers are disclosed. In some embodiments, a method of operation of a radio node for providing sub-PRB transmission comprises selecting two adjacent subcarriers from a set of three allocated subcarriers that are allocated for a sub-PRB transmission that uses Single Carrier Frequency Division Multiple Access (SC-FDMA) Pi/2 Binary Phase Shift Keying (BPSK) modulation using only two adjacent subcarriers out of the set of three allocated subcarriers with Discrete Fourier Transform (DFT) spread length of 2. In some embodiments, the selection of two subcarriers among the three allocated subcarriers is such that the selected adjacent subcarriers varies, e.g., from one cell to another. In doing so, interference is distributed.

In some embodiments, the method further comprises performing one or more tasks related to the sub-PRB transmission. In some embodiments, performing the one or more tasks comprises performing the sub-PRB transmission using SC-FDMA Pi/2 BPSK modulation using only the two selected adjacent subcarriers out of the set of three allocated subcarriers with DFT-spread length of 2. In some other embodiments, performing the one or more tasks comprises sending information that indicates the two selected adjacent subcarriers to another node.

In some embodiments, selecting the two adjacent subcarriers from the set of three allocated subcarriers comprises selecting the two adjacent subcarriers based on a cell Identifier (ID) of a cell that has allocated the sub-PRB transmission. Further, in some embodiments, selecting the two adjacent subcarriers based on the cell ID of the cell that has allocated the sub-PRB transmission comprises selecting the two adjacent subcarriers based on a value equal to the cell ID modulo 2. Further, in some embodiments, the two adjacent subcarriers are the two subcarriers with the lowest indexes among the set of three allocated subcarriers if the value obtained from the cell ID modulo 2 operation is "0", and the two adjacent subcarriers are the two subcarriers with the highest indexes among the set of three allocated subcarriers if the value obtained from the cell ID modulo 2 operation is "1". In some embodiments, the cell ID is a value in the range of and including 0 to 503.

In some embodiments, selecting the two adjacent subcarriers from the set of three allocated subcarriers comprises selecting the two adjacent subcarriers based on whether a cell that has allocated the sub-PRB transmission is either "even" or "odd."

In some embodiments, selecting the two adjacent subcarriers from the set of three allocated subcarriers comprises selecting the two adjacent subcarriers randomly per cell.

In some embodiments, DMRS is mapped to the two selected adjacent subcarriers in accordance with an alternating pattern. In some embodiments, the alternating pattern is deterministic.

In some embodiments, DMRS is mapped to the two selected adjacent subcarriers in accordance with a predefined pattern. In some embodiments, the predefined pattern is a periodic pattern that alternates the DMRS mapping among the two selected adjacent subcarriers. In some other embodiments, the predefined pattern is a pseudorandom pattern that maps DMRS among the two selected adjacent subcarriers.

In some embodiments, DMRS is mapped to only one of the two selected adjacent subcarriers in a predefined manner. In some embodiments, the one of the two selected adjacent subcarriers to which DMRS is mapped is a center subcarrier of the set of three allocated subcarriers. In some other embodiments, the method further comprises selecting the one of the two selected adjacent subcarriers to which DMRS is mapped based on whether a cell that has allocated the sub-PRB transmission is either "even" or "odd."

In some embodiments, DMRS is mapped to the two selected adjacent subcarriers in a predefined manner.

In some embodiments, the radio node is a wireless device. In some embodiments, the method further comprises providing user data, and forwarding the user data to a host computer via a transmission to the base station.

In some other embodiments, the radio node is a base station. In some embodiments, the method further comprises obtaining user data, and forwarding the user data to a host computer or a wireless device.

Embodiments of a radio node are also disclosed. In some embodiments, a radio node for providing sub-PRB transmission comprises processing circuitry configured to cause the radio node to select two adjacent subcarriers from a set of three allocated subcarriers that are allocated for a sub-PRB transmission that uses SC-FDMA Pi/2 BPSK modulation using only two adjacent subcarriers out of the set of three allocated subcarriers with DFT spread length of 2.

In some embodiments, a radio node for providing sub-PRB transmission is adapted to select two adjacent subcarriers from a set of three allocated subcarriers that are allocated for a sub-PRB transmission that uses SC-FDMA Pi/2 BPSK modulation using only two adjacent subcarriers out of the set of three allocated subcarriers with DFT spread length of 2.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 16 through 19 are flowcharts illustrating methods implemented in a communication system in accordance with various embodiments of the present disclosure.

DETAILED DESCRIPTION

Figure 1:
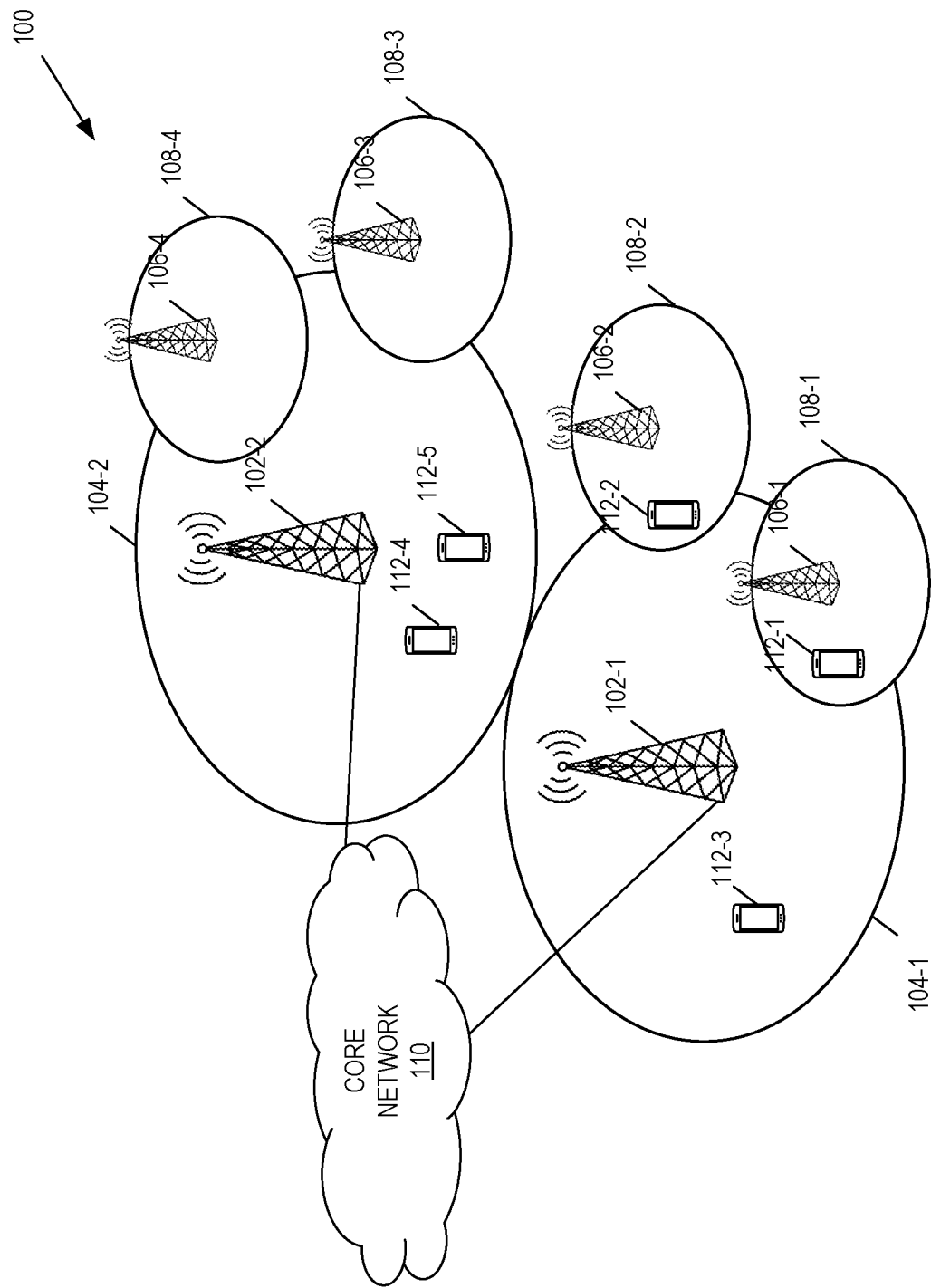
FIG. 1 illustrates one example of a cellular communications network in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generatin Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

When three subcarriers with Single Carrier Frequency Division Multiple Access (SC-FDMA) Pi/2 Binary Phase Shift Keying (BPSK) modulation are allocated for a sub-Physical Resource Block (PRB) transmission, there is a need for a mechanism for selecting which two subcarriers out of the three allocated subcarriers are to be used for the sub-PRB transmission. Also, for three subcarriers with SC-FDMA Pi/2 BPSK modulation, the Demodulation Reference Signal (DMRS) as designed for Narrowband Internet of Things (NB-IoT) in the case of allocating three subcarriers cannot be re-used, since only two out of three allocated subcarriers are used. Further, the subcarrier mapping of the DMRS over two out of three subcarriers should result in a (instantaneous) single-tone transmission.

Certain aspects of the present disclosure and their embodiments may provide solutions to the aforementioned or other challenges.

For "3 subcarriers with SC-FDMA Pi/2 BPSK modulation," the selection of "only 2 adjacent subcarriers out of the 3 allocated subcarriers with DFT-spread of length 2" can be performed through any of the following alternatives:

The selection of the two out of three allocated subcarriers is based on whether the cell that has allocated the sub-PRB transmission is an "even" or an "odd" cell.

The Physical Cell Identifier (PCI) which ranges from 0 to 503 can be used as a way of selecting two out three allocated subcarriers.

The selection of the two out of three allocated subcarriers is random per cell.

The DMRS can be mapped to resource elements within the bandwidth of the two used subcarriers by considering at least one of the following alternatives:

The DMRS is always mapped to only one of the two usable subcarriers in a predefined manner.

The DMRS is mapped to only one of the two usable subcarriers based on whether the cell that has allocated the sub-PRB transmission is an even or an odd cell.

The DMRS has a periodic pattern that alternates the DMRS mapping among the two used subcarriers.

The DMRS pattern is a pseudorandom sequence alternating among the two used subcarriers.

For the introduction of sub-PRB transmissions over Physical Uplink Shared Channel (PUSCH), when three subcarriers with SC-FDMA Pi/2 BPSK modulation are allocated and only two out of the three allocated subcarriers are used, the present disclosure provides methods for selecting and mapping data and demodulation reference signals for sub-PRB transmissions over PUSCH. The proposed methods for selecting the two out of three allocated subcarriers aim at randomizing the interference, including basing the decision depending on whether the cell is classified as an even or odd cell, using the PCI to determine the usable subcarriers, or by using a random number generator per cell. On the other hand, the methods for performing the DMRS mapping can be used to obtain a good estimate for one of the two usable tones (e.g., predetermining the Resource Element (RE) that will carry DMRS), or some other methods (e.g., alternating DMRS pattern, or random DMRS mapping) can be used to obtain estimates for both usable tones.

Certain embodiments may provide one or more of the following technical advantage(s).

Among the deployed cells of a given network, using a mechanism that can be used to vary the selection of only 2 adjacent subcarriers out of the 3 allocated subcarriers with Discrete Fourier Transform (DFT)-spread of length 2 will help to distribute the interference.

For the DMRS, the benefits differ depending on the solution.

If the DMRS is always mapped to only one of the two usable subcarriers in a predefined manner or based on whether the cell that has allocated the sub-PRB transmission is an even or an odd cell, then an estimate of the uplink channel for one of the tones would be as good as in the baseline.

For the predefined solution, the centered subcarrier among three allocated ones can be used for carrying DMRS regardless of knowing which two adjacent subcarriers would be used, since the centered one is always used.

If the DMRS has a deterministic pattern that alternates the DMRS mapping among the two used subcarriers, the number of channel estimates per tone will be half as compared to the baseline but it will still be possible to obtain estimates of the uplink channels for both tones.

If the DMRS mapping randomly commutes among the two used subcarriers, the number of channel estimates for each tone might be unbalanced (i.e., due to the randomness) but it still will be possible to obtain estimates of the uplink channels for both tones.

FIG. 1 illustrates one example of a cellular communications network 100 according to some embodiments of the present disclosure. In the embodiments described herein, the cellular communications network 100 is a 5G NR network or LTE network. In this example, the cellular communications network 100 includes base stations 102-1 and 102-2, which in LTE are referred to as eNBs and in 5G NR are referred to as gNBs, controlling corresponding macro cells 104-1 and 104-2. The base stations 102-1 and 102-2 are generally referred to herein collectively as base stations 102 and individually as base station 102. Likewise, the macro cells 104-1 and 104-2 are generally referred to herein collectively as macro cells 104 and individually as macro cell 104. The cellular communications network 100 also includes a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The base stations 102 (and optionally the low power nodes 106) are connected to a core network 110.

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

The present disclosure relates to a sub-PRB transmission that is allocated a set of $N_A$ allocated subcarriers and that uses a modulation that uses only $N_S$ adjacent subcarriers of the $N_A$ allocated subcarriers where $N_S<N_A$. In the preferred embodiments described herein, the modulation is SC-FDMA Pi/2 BPSK modulation using only two adjacent subcarriers out of the three allocated subcarriers with DFT-spread length of 2 (i.e., $N_S=2$ and $N_A=3$). However, the embodiments described herein are not limited thereto. Embodiments for selecting the $N_S$ adjacent subcarriers from the $N_A$ allocated subcarriers are disclosed herein (see, e.g., Sections I(A)-I(C) below). Embodiments for mapping DMRS to the selected adjacent subcarriers are also disclosed (see, e.g., Sections II(A)-II(D) below).

I. Selection of the Two Out of Three Subcarriers

For three subcarriers with SC-FDMA Pi/2 BPSK modulation, the selection of only two adjacent subcarriers out of the three allocated subcarriers with DFT-spread of length 2 can be performed through any of the alternatives described in the subsections A, B, and C below.

Figure 2:
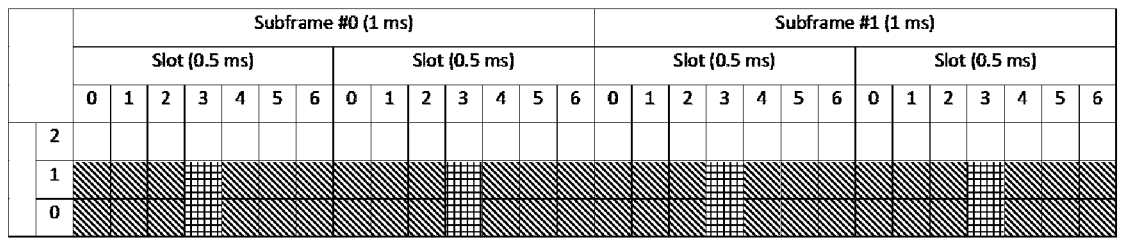
FIG. 2 illustrates one example of selection of two out of three allocated subcarriers for a sub-Physical Resource Block (PRB) transmission using Single Carrier Frequency Division Multiple Access (SC-FDMA) Pi/2 Binary Phase Shift Keying (BPSK) modulation in accordance with some embodiments of the present disclosure.
Figure 2:
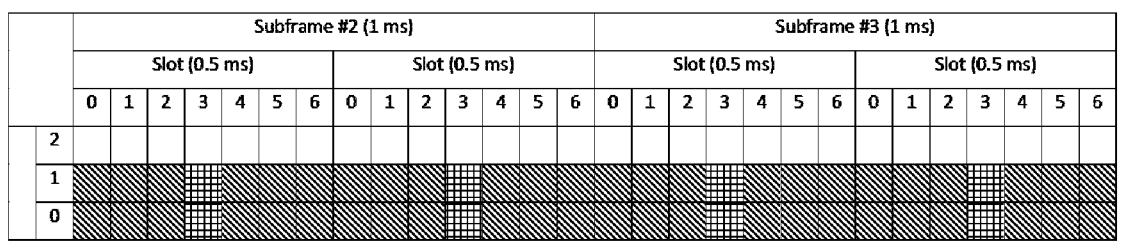
Figure 2:
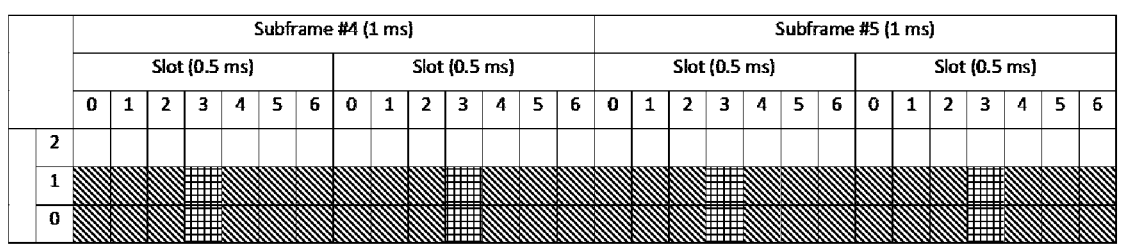
Figure 2:
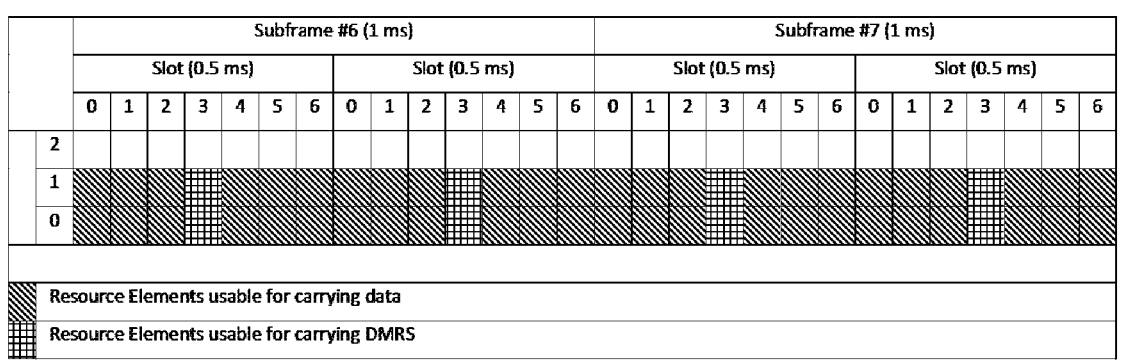

FIG. 2 illustrates one example where two adjacent subcarriers out of three allocated subcarriers have been selected for performing a sub-PRB transmission over PUSCH. In particular, FIG. 2 illustrates an example of a subcarrier allocation consisting of 3 subcarriers when only two out of three are used, and where the Resource Unit (RU) length is 8 milliseconds (ms). Note that on the "Resource Elements usable for carrying data," the single-tone-like transmission can appear on any of the two usable tones, which depends on the bits given at the input of the transceiver chain which produce at the output of the N-Fast Fourier Transform (FFT) a single tone transmission on any of the subcarriers (i.e., {2; 0} or {0; 2} or {0; −2} or {−2; 0}).

Therefore, the only consideration for performing the DMRS mapping is to ensure that the transmission is a single-tone transmission.

A. The Selection of the Two Out of Three Allocated Subcarriers is Based on Whether the Cell that has Allocated the Sub-PRB Transmission is an Even or an Odd Cell A cell that for example by means of a cell's identifier has been classified as either an even or an odd cell can make use of such a classification for determining which two adjacent subcarriers out of the three allocated subcarriers will be utilized.

For example, for a cell that has been classified as an "even cell," the subcarrier with the lowest index would not be utilized; while for a cell that has been classified as an "odd cell," the subcarrier with the highest index would not be utilized. That is:

An "even cell" that has allocated subcarrier #0, #1, and #2 to a given device would discard subcarrier #0, and therefore the two out of the three usable subcarriers would be subcarriers #1 and #2.

On the contrary, an "odd cell" that has allocated subcarrier #0, #1, and #2 to a given device would discard subcarrier #2, and therefore the two out of the three usable subcarriers would be subcarriers #0 and #1.

The above is just an example. Different interpretations are not precluded as long as the two usable subcarriers remain adjacent to each other. For example, the following interpretation is equally valid: For a cell that has been classified as an "even cell," the two subcarriers with the lowest indexes among the allocated subcarriers would be utilized; while for a cell that has been classified as an "odd cell," the subcarriers with the highest indexes among the allocated subcarriers would be utilized.

B. The PCI which Ranges from, e.g., 0 to 503 can be Used as a Way of Selecting Two Out Three Allocated Subcarriers Another way of selecting two out three allocated subcarriers can be based on the PCI which ranges from, e.g., 0 to 503. Using the PCI, a Modulus operation can be applied to determine the subcarrier that will not be used (e.g., Non_used_allocated_subcarrier=mod(PCI,2)).

At first glance it can be though that "three" should be the number used in the Modulus operation (i.e., mod(PCI,3)) but that will sometimes lead to not using the subcarrier in the middle; however, the agreement says that the two selected subcarriers should be adjacent. Thus, mod(PCI,2) should be used, where for example "0" could mean that subcarrier #0 is not usable, and "1" could mean that subcarrier number #2 is not usable.

Yet again, other interpretations are not precluded. Another interpretation for the outcome of the mod(PCI,2) operation can be for example that "0" could mean that the two subcarriers with the lowest indexes among the allocated subcarriers would be utilized, and "1" could mean that the two subcarriers with the highest indexes among the three allocated subcarriers would be utilized.

C. The Selection of the Two Out of Three Allocated Subcarriers is Random Per Cell Another alternative for selecting two out three allocated subcarriers can be based on making use of a random number generator using a different seed per cell. For example:

If the generator returns integer values equal to "0" and "1", which are drawn from a discrete distribution, then the methodology described in the Selection Of The Two Out Of Three Allocated Subcarriers Is Based On Whether The Cell That Has Allocated The Sub-PRB Transmission Is An Even Or An Odd Cell section above can be followed where the "0" and "1" take the role of either an even or an odd cell.

On the other hand, if the generator returns pseudorandom integer values drawn from a discrete distribution, then the methodology described in the PCI Which Ranges From 0 To 503 Can Be Used As A Way Of Selecting Two Out Three Allocated Subcarriers section above can be followed where the random number takes the role of the PCI.

II. DMRS Mapping Over One Out of the Two Usable Subcarriers

The DMRS can be mapped to REs within the bandwidth of the two used subcarriers by following any of the alternatives described in the subsections below.

Figure 3:
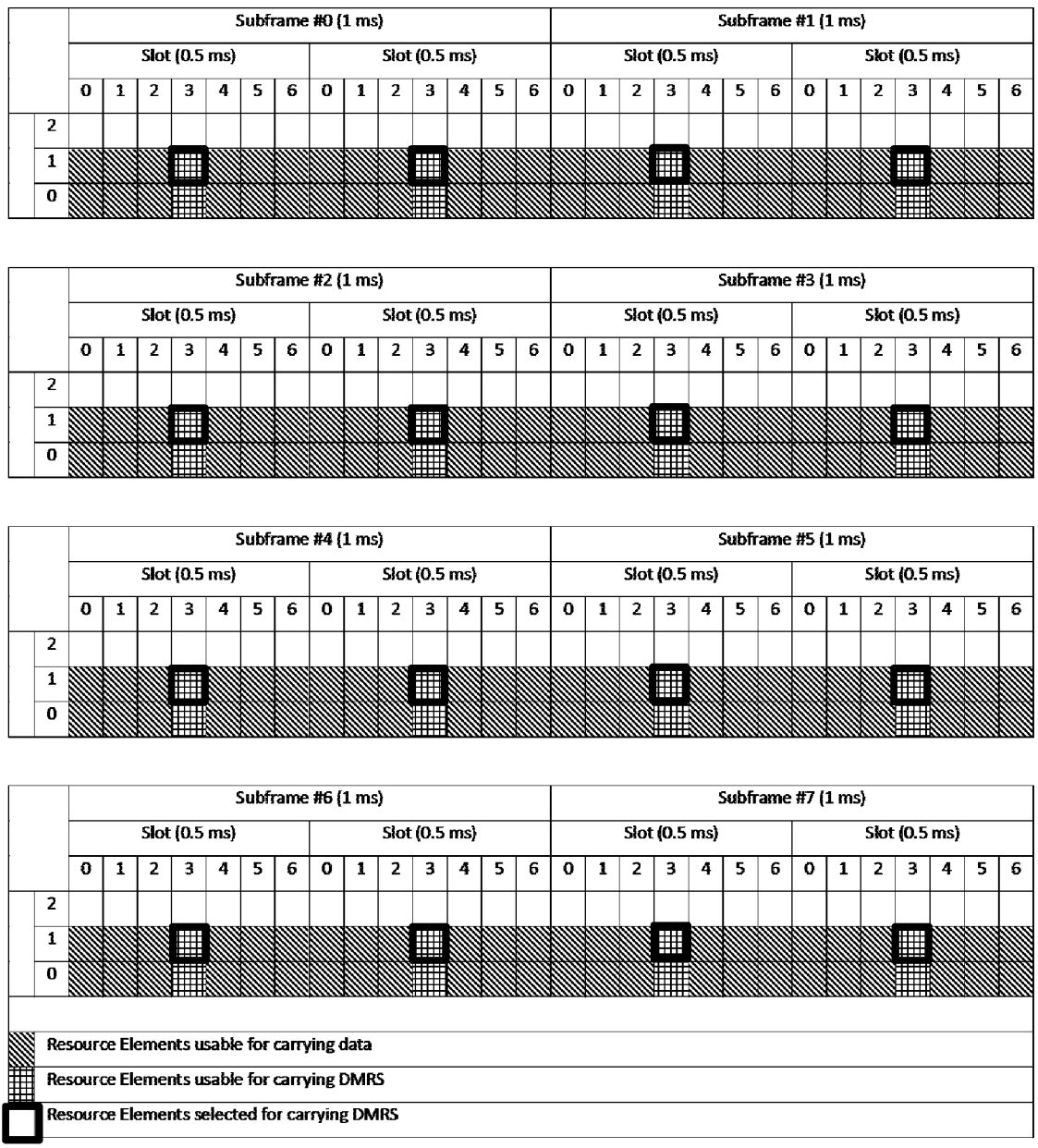
FIGS. 3 through 7 illustrate examples of Demodulation Reference Signal (DMRS) mapping when using two out of three allocated subcarriers for a sub-PRB transmission using SC-FDMA Pi/2 BPSK modulation in accordance with various embodiments of the present disclosure.

A. The DMRS Is Mapped To The Two Usable Subcarriers In A Predefined Manner With this approach, the DMRS is always mapped to the two usable subcarriers in a predefined manner, meaning that the estimate of the uplink channel for one of the two tones would be as good as in the baseline. FIG. 3 shows an example where the DMRS was predetermined to be mapped to the centered subcarrier (i.e., subcarrier #1) regardless of knowing which of the two adjacent subcarriers (subcarriers #0 and #1 in the depicted example) would be used for carrying data, since the centered subcarrier among three allocated ones is always used. Specifically, FIG. 3 shows an example of a subcarrier allocation consisting of 3 subcarriers when only two out of three are used, where the RU length is 8 ms, and when the DMRS is mapped in a predetermined manner to only one subcarrier.

Figure 4:
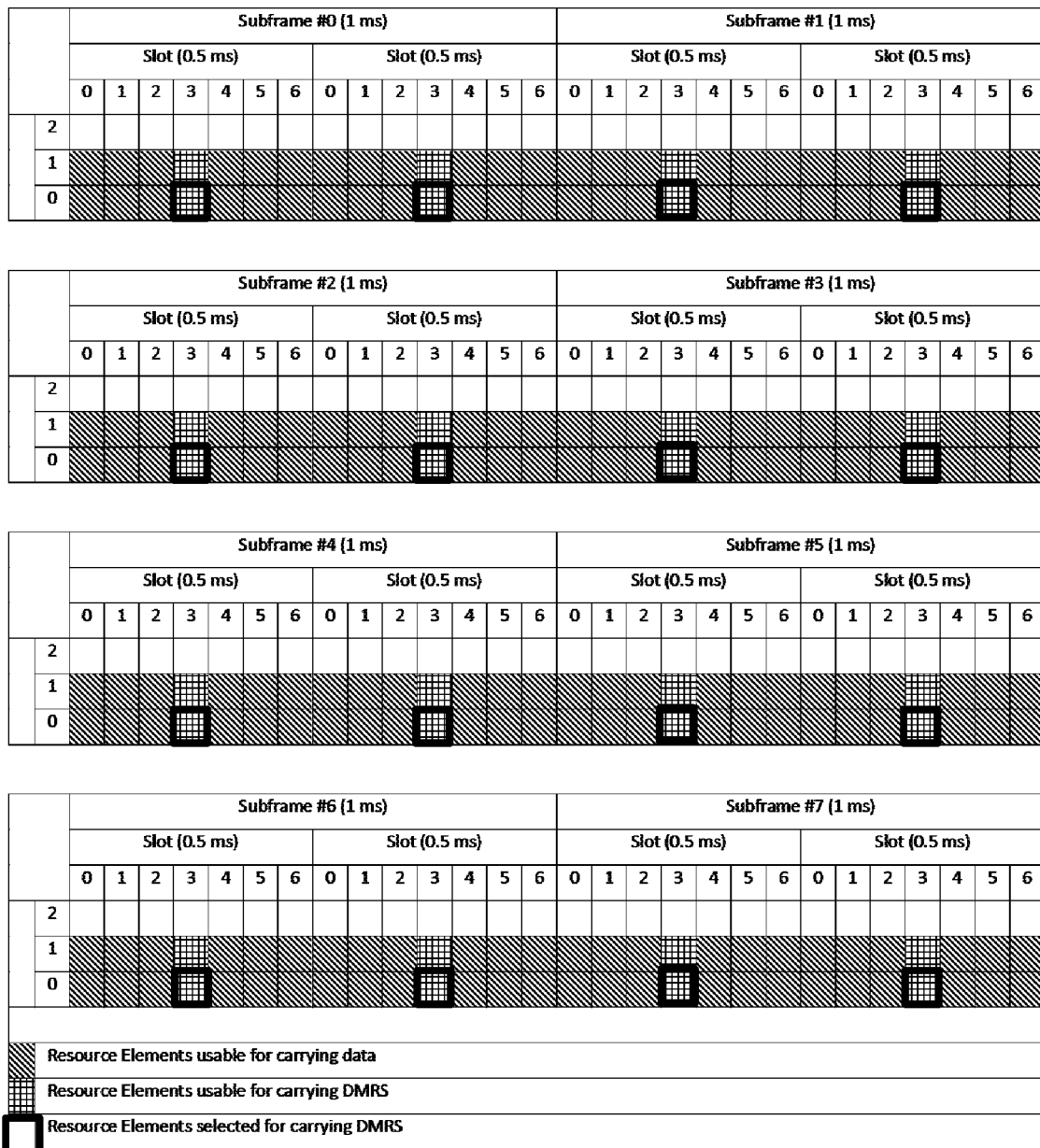

Another example is depicted in FIG. 4, where the DMRS is always mapped to the subcarrier located in the edge among the used subcarriers, i.e. subcarrier #0 in the depicted example. Note that if instead the usable subcarrier would have been subcarriers #1 and #2, then the carrier in the edge where the DMRS would be mapped would have been subcarrier #2. More specifically, FIG. 4 shows an example of a subcarrier allocation consisting of 3 subcarriers when only two out of three are used, where the RU length is 8 ms, and when the DMRS is mapped to the subcarrier with the lowest index among the usable subcarriers.

The method of mapping the DMRS to the two usable subcarriers in a predefined manner can be combined with any of methods described in the Selection Of The Two Out Of Three Allocated Subcarriers section above for selecting two out of three allocated subcarriers.

B. The DMRS is Mapped to Only One of the Two Usable Subcarriers Based on Whether the Cell that has Allocated the Sub-PRB Transmission is an Even or an Odd Cell A cell that for example by means of a cell's identifier has been classified as either an even or an odd cell can make use of such a classification for determining which two adjacent subcarriers will be used for carrying DMRS.

Figure 5:
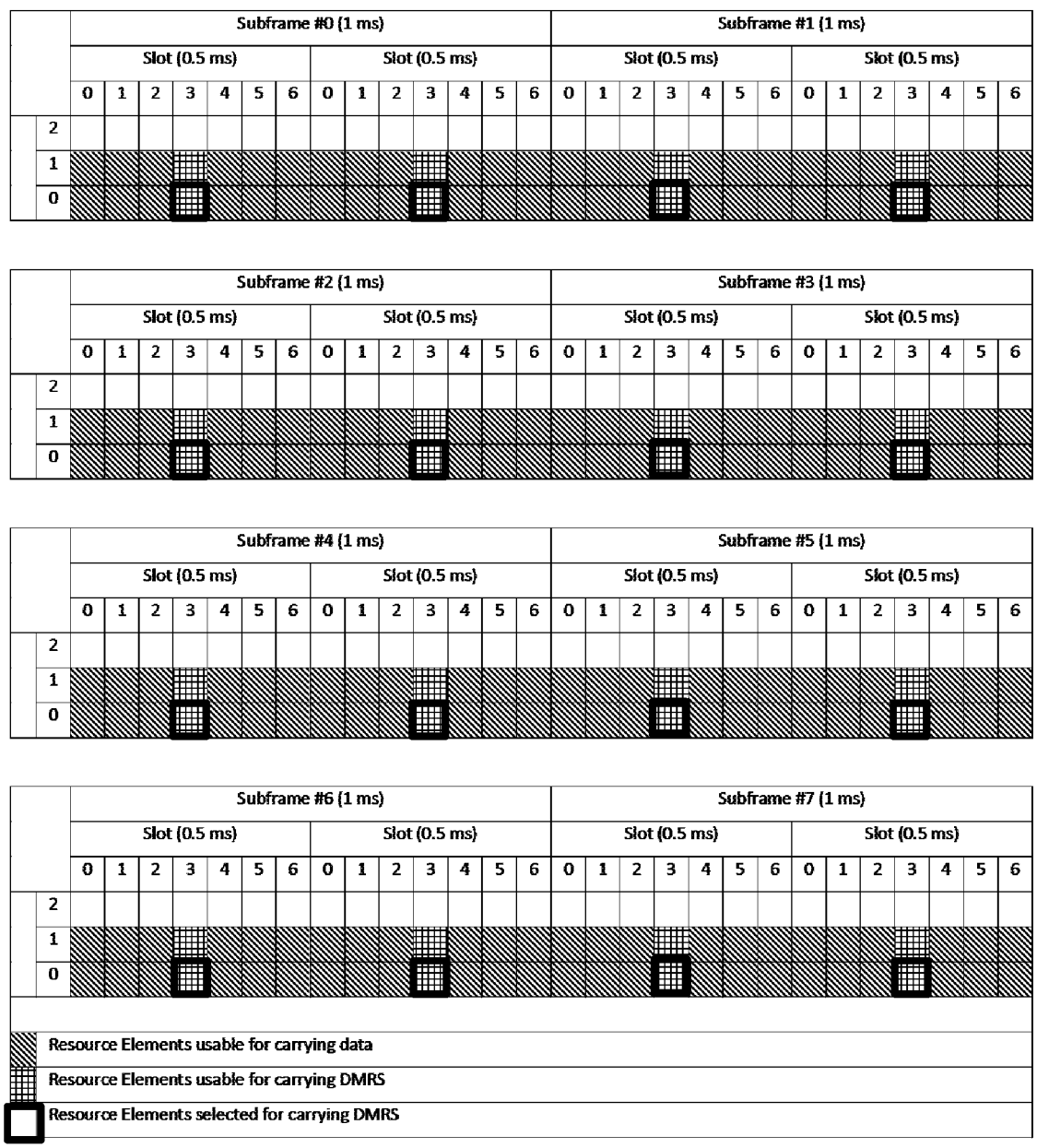

As an example, for a cell that has been classified as an "even cell" the subcarrier with the lowest index among two adjacent subcarriers can be utilized for carrying DMRS, while for a cell that has been classified as an "odd cell" the subcarrier with the highest index among the two adjacent subcarriers can be utilized for carrying DMRS. An example is depicted in FIG. 5. FIG. 5 shows an example of a subcarrier allocation consisting of 3 subcarriers when only two out of three are used, where the RU length is 8 ms, and when the DMRS is mapped to the subcarrier with the lowest index among the usable subcarriers given that the cell has been classified as an "even cell."

Moreover, this solution can be combined with any of the methods for selecting two out of three allocated subcarriers described above. In one example, if a cell is classified as an "even cell" then the subcarrier with the lowest index (i.e., subcarrier #0) is not utilized and then the subcarrier carrying DMRS can be selected to be the one with lowest index among the remaining usable subcarriers (i.e., subcarrier #1), whereas on the other hand if the cell is classified as an "odd cell" then the subcarrier with the highest index (i.e., subcarrier #2) is not utilized and then the subcarrier carrying DMRS can be selected to be the one with the highest index among the remaining usable subcarriers (i.e., subcarrier #1). In this example, subcarrier #1 ends up being used for DMRS in both even and odd cells, but other combinations are not precluded.

Figure 6:
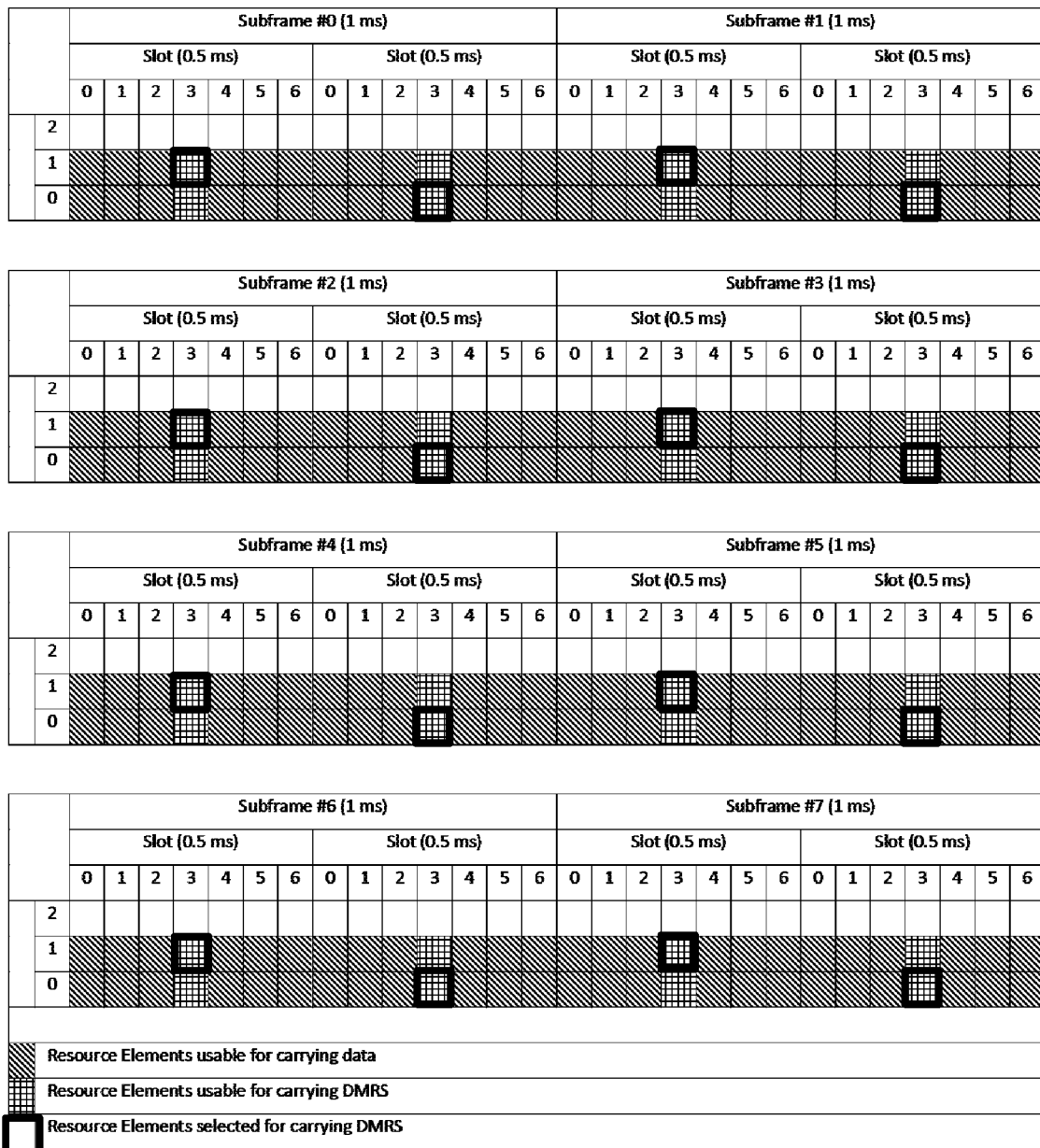

C. The DMRS has a Deterministic Pattern that Alternates the DMRS Mapping Among the Two Used Subcarriers The DMRS can consist of a deterministic pattern that alternates the DMRS mapping among the two used subcarriers as depicted in FIG. 6. In this case, the number of channel estimates per tone will be half as compared to the ones in the baseline but it will still be possible to obtain estimates of the uplink channels for both tones. More specifically, FIG. 6 shows an example of a subcarrier allocation consisting of 3 subcarriers when only two out of three are used, where the RU length is 8 ms, and when the DMRS is mapped in an alternating manner among the two usable subcarrier.

Other alternating patterns are not precluded, and this solution can be combined with any of the methods for selecting two out of three allocated subcarriers described above.

Note that, since in some embodiments the two used subcarriers are selected from the three allocated subcarriers based on the cell Identifier (ID), the DMRS mapping can also be said to be based on the cell ID since the two subcarriers to which DMRS is mapped are selected based on the cell ID, in those embodiments.

Figure 7:
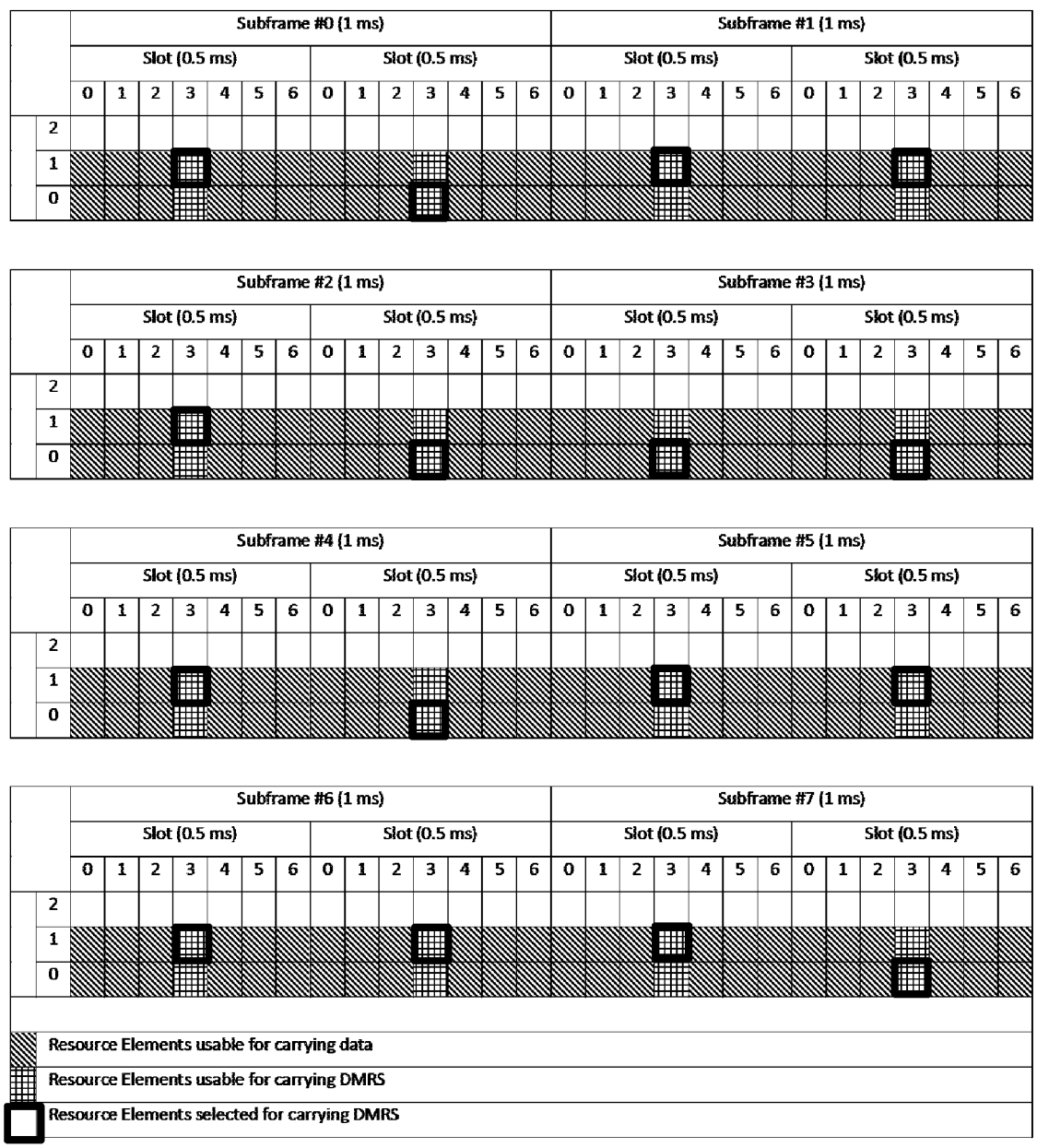

D. The DMRS Mapping Commutes According to a Pseudorandom Sequence Among the Two Used Subcarriers The DMRS mapping can be made to commute according to a pseudorandom sequence among the two used subcarriers as shown in FIG. 7. In this case, the number of channel estimates for each tone might be unbalanced (i.e., due to the randomness, depending on the distribution used to retrieve the random values) but it still will be possible to obtain estimates of the uplink channels for both tones. More specifically, FIG. 7 shows an example of a subcarrier allocation consisting of 3 subcarriers when only two out of three are used, where the RU length is 8 ms, and when the DMRS is mapped in random manner among the two usable subcarrier.

The DMRS mapping varies and depends on the distribution used to generate the random values determining the RE to be used for performing the subcarrier mapping. Moreover, this solution can be combined with any of the methods for selecting two out of three allocated subcarriers described in above.

Figure 8:
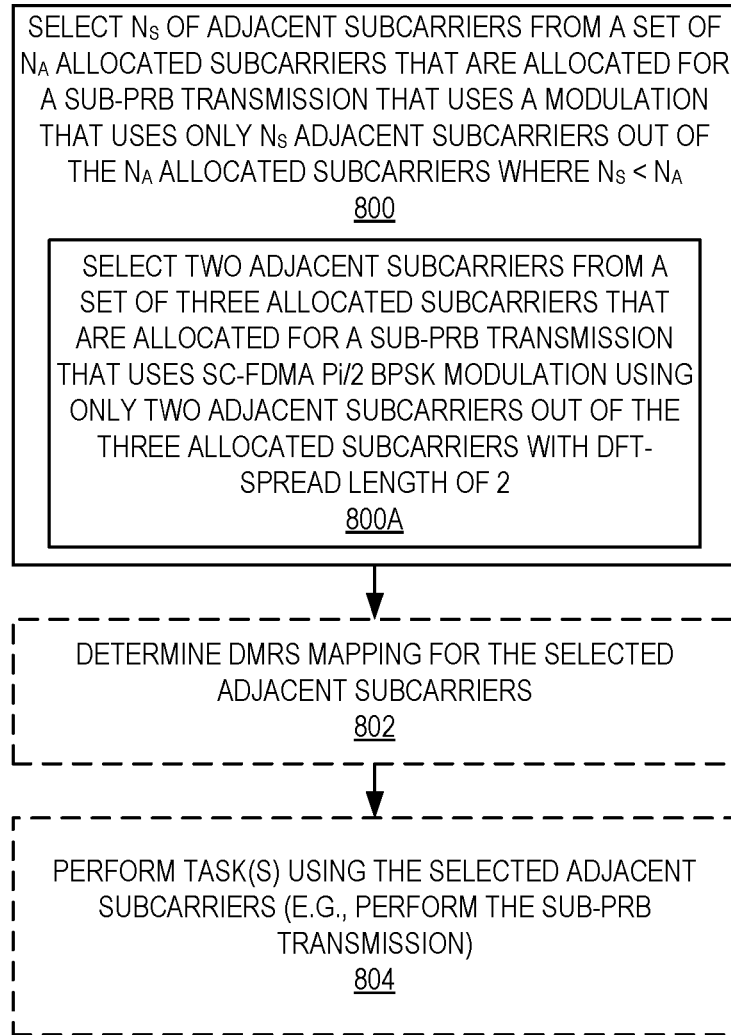
FIG. 8 is a flow chart that illustrates the operation of a radio node for sub-PRB transmission using SC-FDMA Pi/2 BPSK modulation in accordance with some embodiments of the present disclosure.

FIG. 8 is a flow chart that illustrates the operation of a radio node (e.g., a base station 102, a low power node 106, or a wireless device 112) in accordance with some embodiments of the present disclosure. Optional steps are represented by dashed lines. As illustrated, the radio node selects a number $N_S$ of adjacent subcarriers from a set of $N_A$ allocated subcarriers that are allocated for a sub-PRB transmission that uses a modulation using only $N_S$ adjacent subcarriers out of the $N_A$ allocated subcarriers where $N_S<N_A$ (step 800). In other words, the radio node selects $N_S$ adjacent subcarriers from a set of $N_A$ allocated subcarriers, which corresponding data is passed through a SC-FDMA Pi/2 BPSK modulation and a DFT spread length of 2. As discussed above, in some preferred embodiments, there are three allocated subcarriers (i.e., $N_A$=3), and the modulation is SC-FDMA Pi/2 BPSK modulation using only two (i.e., $N_S$=2) of the three allocated subcarriers with DFT-spread length of 2. Thus, in some embodiments in step 800, the radio node selects two adjacent subcarriers from a set of three allocated subcarriers that are allocated for a sub-PRB transmission that uses SC-FDMA Pi/2 BPSK modulation using only two adjacent subcarriers out of the three allocated subcarriers with DFT-spread length of 2 (step 800A). The radio node selects the $N_S$ (e.g., 2) adjacent subcarriers from the allocated subcarriers in accordance with any of the embodiments described above.

Optionally, the radio node determines a DMRS mapping for the selected adjacent subcarriers (step 802). The DMRS mapping may be determined in accordance with any of the embodiments described above. Optionally, the radio node performs one or more tasks using the selected adjacent subcarriers and, optionally, the determined DMRS mapping (step 804). For example, in some embodiments the radio node is a wireless device 112, and the wireless device 112 performs the sub-PRB transmission using the selected adjacent subcarriers. When performing the sub-PRB transmission, the wireless device 112 maps DMRS to the selected adjacent subcarriers in accordance with the determined DMRS mapping. As another example, in some embodiments, the radio node is a radio access node (e.g., a base station 102 or a low-power node 106), and the radio access node sends an indication of the selected adjacent subcarriers and, optionally, the DMRS mapping to another node (e.g., a wireless device 112 for which the sub-PRB transmission is allocated).

Some example embodiments are as follows. In one embodiment, for three subcarriers with SC-FDMA Pi/2 BPSK modulation, the selection of only two adjacent subcarriers out of the three allocated subcarriers with DFT-spread of length 2 is based on whether the cell that has allocated the sub-PRB transmission is an even or an odd cell (e.g., an "even cell" that has allocated subcarriers #0, #1, and #2 to a given device, would discard subcarrier #0, and therefore the two out of the three usable subcarriers would be subcarrier #1 and #2).

In one embodiment, for three subcarriers with SC-FDMA Pi/2 BPSK modulation, the selection of only two adjacent subcarriers out of the three allocated subcarriers with DFT-spread of length 2 is based on the PCI along with a Modulus operation to determine the subcarrier that will not be used (e.g., Non_used_allocated_subcarrier=mod(PCI,2)).

In one embodiment, for three subcarriers with SC-FDMA Pi/2 BPSK modulation, the selection of only two adjacent subcarriers out of the three allocated subcarriers with DFT-spread of length 2 is based on making use of a random number generator using a different seed per cell.

In one embodiment, the DMRS is always mapped to only one of the two usable subcarriers in a predefined manner, aiming at obtaining accurate channel estimates for one of the two usable tones. In relation with this embodiment, the centered subcarrier among three allocated subcarriers can be used for carrying DMRS regardless of knowing which two adjacent subcarriers would be used, since the centered one is always used.

In one embodiment, the DMRS is mapped to only one of the two usable subcarriers based on whether the cell that has allocated the sub-PRB transmission is an even or an odd cell, aiming at obtaining accurate channel estimates for one of the two usable tones.

In one embodiment, the DMRS is mapped using a deterministic pattern that alternates the DMRS mapping among the two used subcarriers, aiming at obtaining channel estimates for the two usable tones.

In one embodiment, the DMRS is mapped by using a pseudorandom alternating sequence commuting between the two used subcarriers, aiming at obtaining channel estimates for the two usable tones.

In one embodiment, the methods for mapping the DMRS on the REs of the two usable subcarriers are compatible with the embodiments describing methods for selecting two out of three allocated subcarriers.

Figure 9:
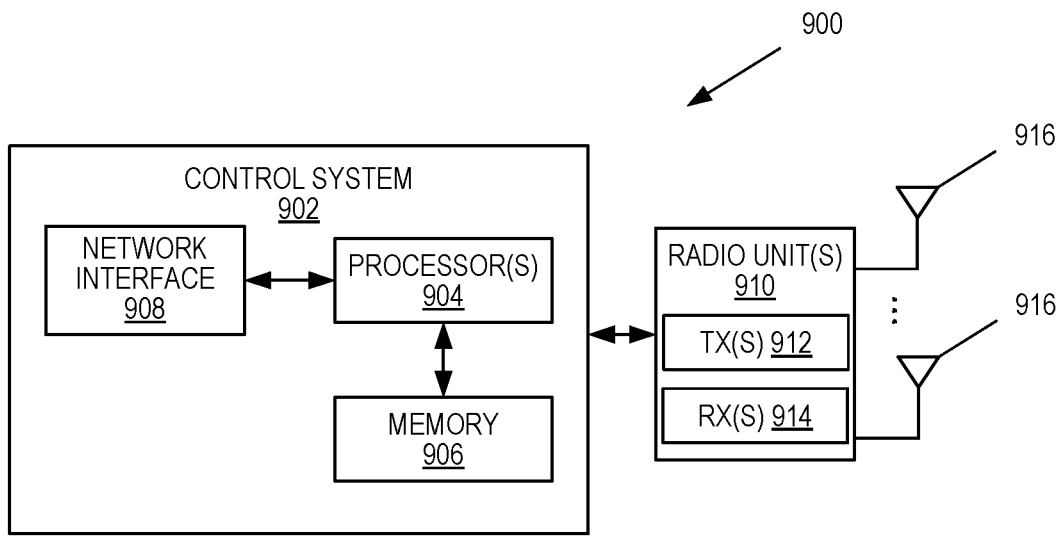
FIG. 9 is a schematic block diagram of a radio access node according to some embodiments of the present disclosure.

FIG. 9 is a schematic block diagram of a radio access node 900 according to some embodiments of the present disclosure. The radio access node 900 may be, for example, a base station 102 or 106. As illustrated, the radio access node 900 includes a control system 902 that includes one or more processors 904 (e.g., Central Processing Units (CPUs), Application Specific Integrated Circuits (ASICs), Field Programmable Gate Arrays (FPGAs), and/or the like), memory 906, and a network interface 908. In addition, the radio access node 900 includes one or more radio units 910 that each includes one or more transmitters 912 and one or more receivers 914 coupled to one or more antennas 916. In some embodiments, the radio unit(s) 910 is external to the control system 902 and connected to the control system 902 via, e.g., a wired connection (e.g., an optical cable). However, in some other embodiments, the radio unit(s) 910 and potentially the antenna(s) 916 are integrated together with the control system 902. The one or more processors 904 operate to provide one or more functions of a radio access node 900 as described herein. In some embodiments, the function(s) are implemented in software that is stored, e.g., in the memory 906 and executed by the one or more processors 904.

Figure 10:
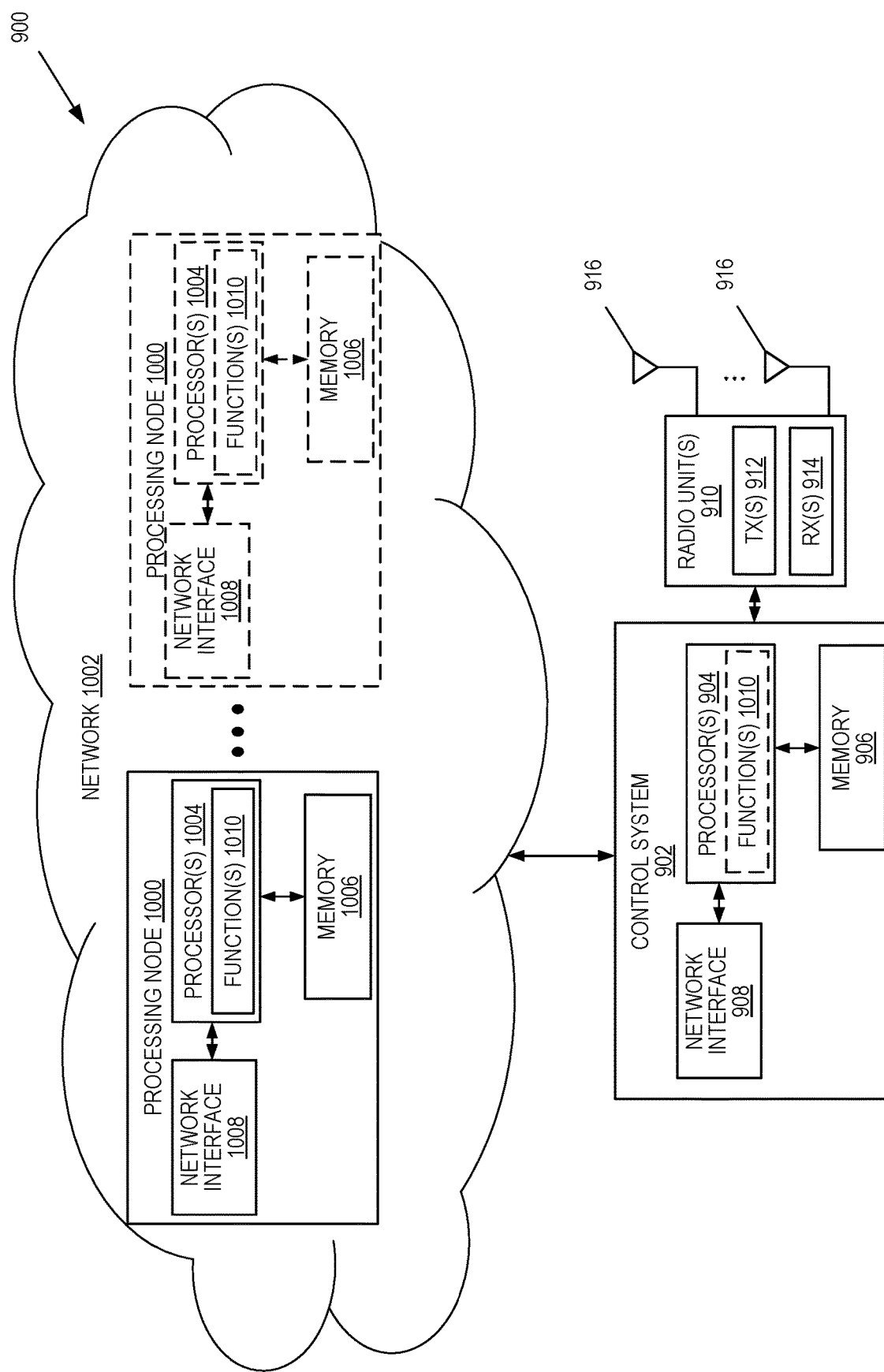
FIG. 10 is a schematic block diagram that illustrates a virtualized embodiment of the radio access node according to some embodiments of the present disclosure.

FIG. 10 is a schematic block diagram that illustrates a virtualized embodiment of the radio access node 900 according to some embodiments of the present disclosure. This discussion is equally applicable to other types of network nodes. Further, other types of network nodes may have similar virtualized architectures.

As used herein, a "virtualized" radio access node is an implementation of the radio access node 900 in which at least a portion of the functionality of the radio access node 900 is implemented as a virtual component(s) (e.g., via a virtual machine(s) executing on a physical processing node(s) in a network(s)). As illustrated, in this example, the radio access node 900 includes the control system 902 that includes the one or more processors 904 (e.g., CPUs, ASICs, FPGAs, and/or the like), the memory 906, and the network interface 908 and the one or more radio units 910 that each includes the one or more transmitters 912 and the one or more receivers 914 coupled to the one or more antennas 916, as described above. The control system 902 is connected to the radio unit(s) 910 via, for example, an optical cable or the like. The control system 902 is connected to one or more processing nodes 1000 coupled to or included as part of a network(s) 1002 via the network interface 908. Each processing node 1000 includes one or more processors 1004 (e.g., CPUs, ASICs, FPGAs, and/or the like), memory 1006, and a network interface 1008.

In this example, functions 1010 of the radio access node 900 described herein are implemented at the one or more processing nodes 1000 or distributed across the control system 902 and the one or more processing nodes 1000 in any desired manner. In some particular embodiments, some or all of the functions 1010 of the radio access node 900 described herein are implemented as virtual components executed by one or more virtual machines implemented in a virtual environment(s) hosted by the processing node(s) 1000. As will be appreciated by one of ordinary skill in the art, additional signaling or communication between the processing node(s) 1000 and the control system 902 is used in order to carry out at least some of the desired functions 1010. Notably, in some embodiments, the control system 902 may not be included, in which case the radio unit(s) 910 communicate directly with the processing node(s) 1000 via an appropriate network interface(s).

In some embodiments, a computer program including instructions which, when executed by at least one processor, causes the at least one processor to carry out the functionality of radio access node 900 or a node (e.g., a processing node 1000) implementing one or more of the functions 1010 of the radio access node 900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
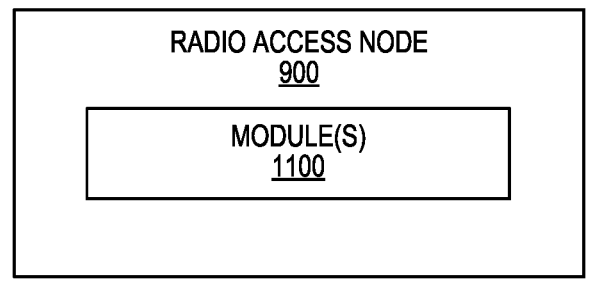
FIG. 11 is a schematic block diagram of the radio access node according to some other embodiments of the present disclosure.

FIG. 11 is a schematic block diagram of the radio access node 900 according to some other embodiments of the present disclosure. The radio access node 900 includes one or more modules 1100, each of which is implemented in software. The module(s) 1100 provide the functionality of the radio access node 900 described herein. This discussion is equally applicable to the processing node 1000 of FIG. 10 where the modules 1100 may be implemented at one of the processing nodes 1000 or distributed across multiple processing nodes 1000 and/or distributed across the processing node(s) 1000 and the control system 902.

Figure 12:
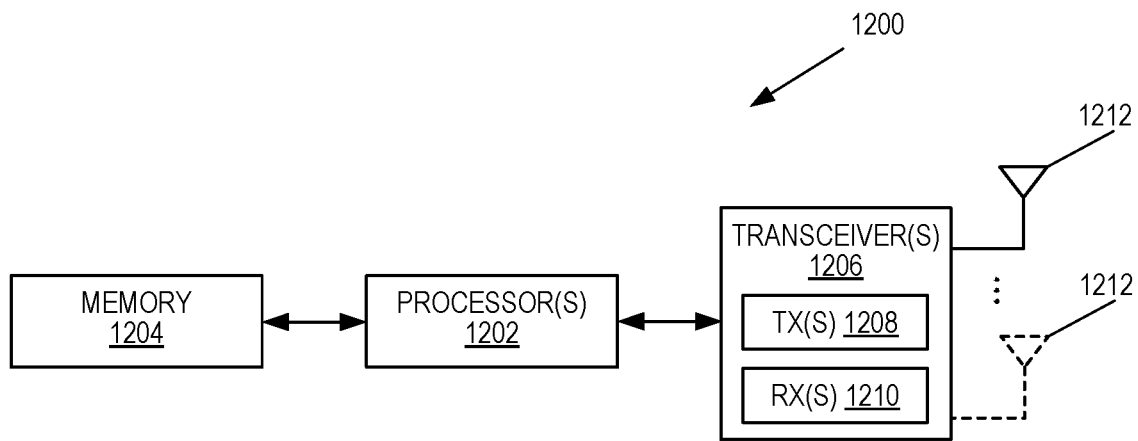
FIG. 12 is a schematic block diagram of a User Equipment (UE) according to some embodiments of the present disclosure.

FIG. 12 is a schematic block diagram of a UE 1200 according to some embodiments of the present disclosure. As illustrated, the UE 1200 includes one or more processors 1202 (e.g., CPUs, ASICs, FPGAs, and/or the like), memory 1204, and one or more transceivers 1206 each including one or more transmitters 1208 and one or more receivers 1210 coupled to one or more antennas 1212. In some embodiments, the functionality of the UE 1200 described above may be fully or partially implemented in software that is, e.g., stored in the memory 1204 and executed by the processor(s) 1202.

In some embodiments, a computer program including instructions which, when executed by at least one processor, causes the at least one processor to carry out the functionality of the UE 1200 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
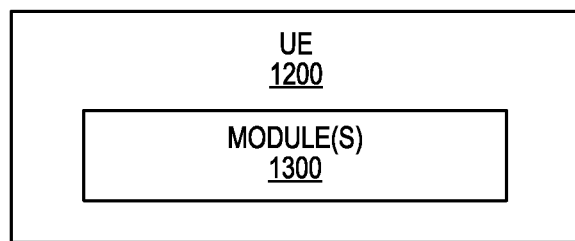
FIG. 13 is a schematic block diagram of the UE according to some other embodiments of the present disclosure.

FIG. 13 is a schematic block diagram of the UE 1200 according to some other embodiments of the present disclosure. The UE 1200 includes one or more modules 1300, each of which is implemented in software. The module(s) 1300 provide the functionality of the UE 1200 described herein.

Figure 14:
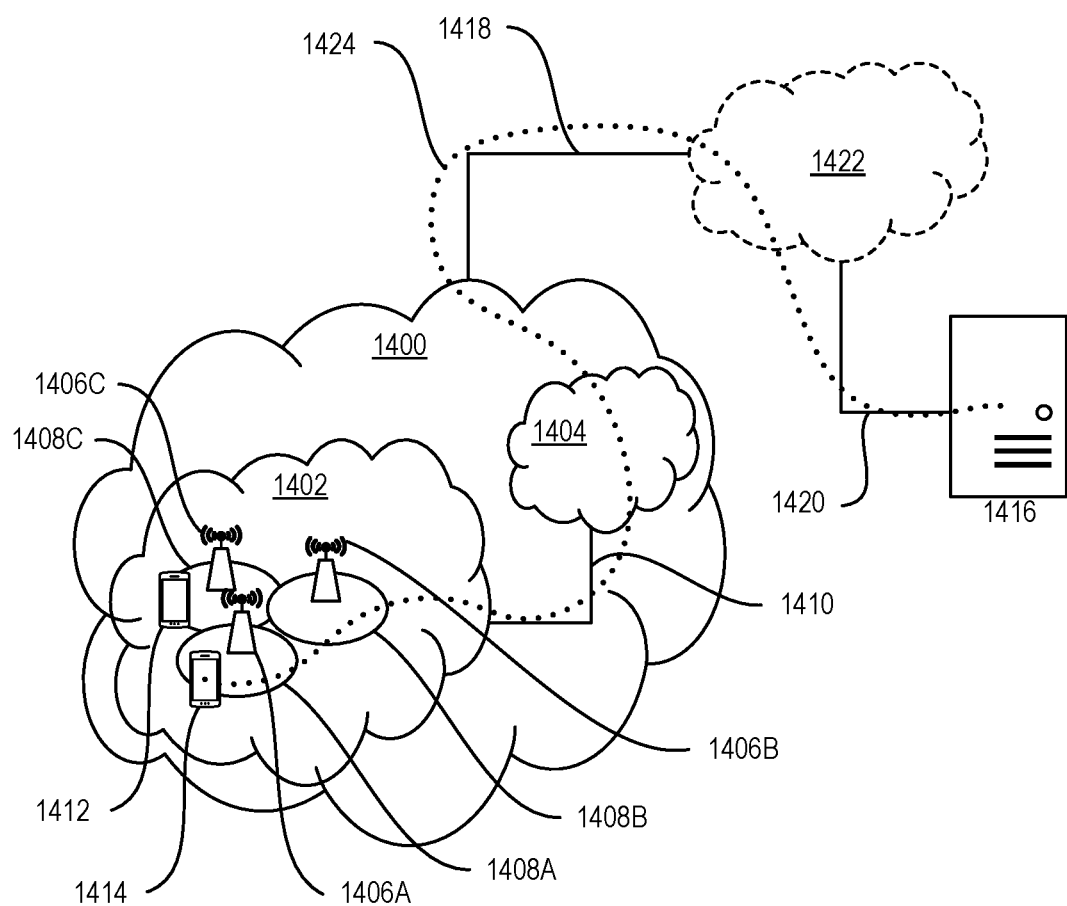
FIG. 14 illustrates a communication system in accordance with some embodiments of the present disclosure.

With reference to FIG. 14, in accordance with an embodiment, a communication system includes a telecommunication network 1400, such as a 3GPP-type cellular network, which comprises an access network 1402, such as a Radio Access Network (RAN), and a core network 1404. The access network 1402 comprises a plurality of base stations 1406A, 1406B, 1406C, such as Node Bs, eNBs, gNBs, or other types of wireless Access Points (APs), each defining a corresponding coverage area 1408A, 1408B, 1408C. Each base station 1406A, 1406B, 1406C is connectable to the core network 1404 over a wired or wireless connection 1410. A first UE 1412 located in coverage area 1408C is configured to wirelessly connect to, or be paged by, the corresponding base station 1406C. A second UE 1414 in coverage area 1408A is wirelessly connectable to the corresponding base station 1406A. While a plurality of UEs 1412, 1414 are illustrated in this example, the disclosed embodiments are equally applicable to a situation where a sole UE is in the coverage area or where a sole UE is connecting to the corresponding base station 1406.

The telecommunication network 1400 is itself connected to a host computer 1416, which may be embodied in the hardware and/or software of a standalone server, a cloud-implemented server, a distributed server, or as processing resources in a server farm. The host computer 1416 may be under the ownership or control of a service provider, or may be operated by the service provider or on behalf of the service provider. Connections 1418 and 1420 between the telecommunication network 1400 and the host computer 1416 may extend directly from the core network 1404 to the host computer 1416 or may go via an optional intermediate network 1422. The intermediate network 1422 may be one of, or a combination of more than one of, a public, private, or hosted network; the intermediate network 1422, if any, may be a backbone network or the Internet; in particular, the intermediate network 1422 may comprise two or more sub-networks (not shown).

The communication system of FIG. 14 as a whole enables connectivity between the connected UEs 1412, 1414 and the host computer 1416. The connectivity may be described as an Over-the-Top (OTT) connection 1424. The host computer 1416 and the connected UEs 1412, 1414 are configured to communicate data and/or signaling via the OTT connection 1424, using the access network 1402, the core network 1404, any intermediate network 1422, and possible further infrastructure (not shown) as intermediaries. The OTT connection 1424 may be transparent in the sense that the participating communication devices through which the OTT connection 1424 passes are unaware of routing of uplink and downlink communications. For example, the base station 1406 may not or need not be informed about the past routing of an incoming downlink communication with data originating from the host computer 1416 to be forwarded (e.g., handed over) to a connected UE 1412. Similarly, the base station 1406 need not be aware of the future routing of an outgoing uplink communication originating from the UE 1412 towards the host computer 1416.

Example implementations, in accordance with an embodiment, of the UE, base station, and host computer discussed in the preceding paragraphs will now be described with reference to FIG. 15. In a communication system 1500, a host computer 1502 comprises hardware 1504 including a communication interface 1506 configured to set up and maintain a wired or wireless connection with an interface of a different communication device of the communication system 1500. The host computer 1502 further comprises processing circuitry 1508, which may have storage and/or processing capabilities. In particular, the processing circuitry 1508 may comprise one or more programmable processors, ASICs, FPGAs, or combinations of these (not shown) adapted to execute instructions. The host computer 1502 further comprises software 1510, which is stored in or accessible by the host computer 1502 and executable by the processing circuitry 1508. The software 1510 includes a host application 1512. The host application 1512 may be operable to provide a service to a remote user, such as a UE 1514 connecting via an OTT connection 1516 terminating at the UE 1514 and the host computer 1502. In providing the service to the remote user, the host application 1512 may provide user data which is transmitted using the OTT connection 1516.

The communication system 1500 further includes a base station 1518 provided in a telecommunication system and comprising hardware 1520 enabling it to communicate with the host computer 1502 and with the UE 1514. The hardware 1520 may include a communication interface 1522 for setting up and maintaining a wired or wireless connection with an interface of a different communication device of the communication system 1500, as well as a radio interface 1524 for setting up and maintaining at least a wireless connection 1526 with the UE 1514 located in a coverage area (not shown in FIG. 15) served by the base station 1518. The communication interface 1522 may be configured to facilitate a connection 1528 to the host computer 1502. The connection 1528 may be direct or it may pass through a core network (not shown in FIG. 15) of the telecommunication system and/or through one or more intermediate networks outside the telecommunication system. In the embodiment shown, the hardware 1520 of the base station 1518 further includes processing circuitry 1530, which may comprise one or more programmable processors, ASICs, FPGAs, or combinations of these (not shown) adapted to execute instructions. The base station 1518 further has software 1532 stored internally or accessible via an external connection.

The communication system 1500 further includes the UE 1514 already referred to. The UE's 1514 hardware 1534 may include a radio interface 1536 configured to set up and maintain a wireless connection 1526 with a base station serving a coverage area in which the UE 1514 is currently located. The hardware 1534 of the UE 1514 further includes processing circuitry 1538, which may comprise one or more programmable processors, ASICs, FPGAs, or combinations of these (not shown) adapted to execute instructions. The UE 1514 further comprises software 1540, which is stored in or accessible by the UE 1514 and executable by the processing circuitry 1538. The software 1540 includes a client application 1542. The client application 1542 may be operable to provide a service to a human or non-human user via the UE 1514, with the support of the host computer 1502. In the host computer 1502, the executing host application 1512 may communicate with the executing client application 1542 via the OTT connection 1516 terminating at the UE 1514 and the host computer 1502. In providing the service to the user, the client application 1542 may receive request data from the host application 1512 and provide user data in response to the request data. The OTT connection 1516 may transfer both the request data and the user data. The client application 1542 may interact with the user to generate the user data that it provides.

Figure 15:
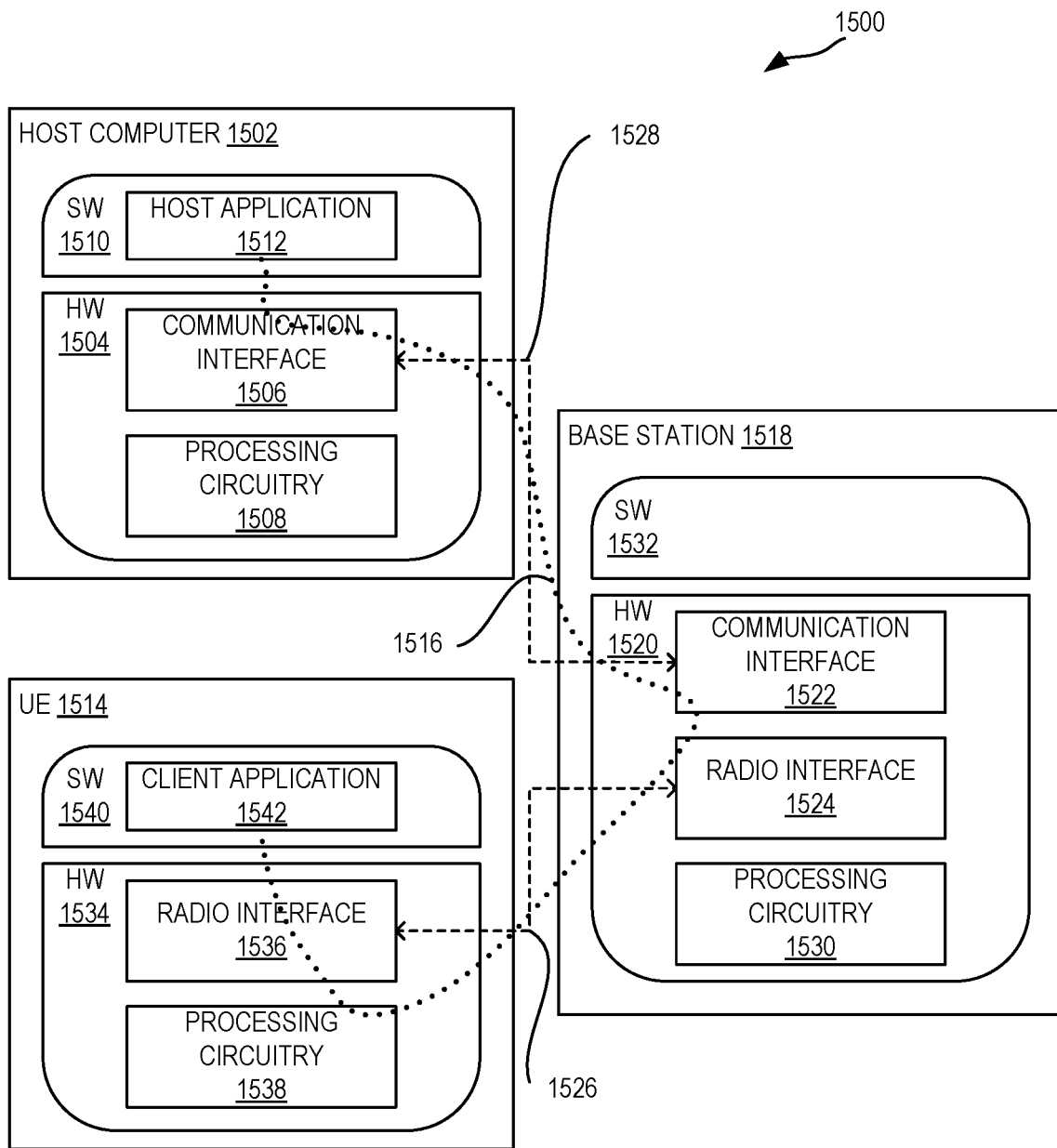
FIG. 15 illustrates a UE, a base station, and a host computer in accordance with some embodiments of the present disclosure.

It is noted that the host computer 1502, the base station 1518, and the UE 1514 illustrated in FIG. 15 may be similar or identical to the host computer 1416, one of the base stations 1406A, 1406B, 1406C, and one of the UEs 1412, 1414 of FIG. 14, respectively. This is to say, the inner workings of these entities may be as shown in FIG. 15 and independently, the surrounding network topology may be that of FIG. 14.

In FIG. 15, the OTT connection 1516 has been drawn abstractly to illustrate the communication between the host computer 1502 and the UE 1514 via the base station 1518 without explicit reference to any intermediary devices and the precise routing of messages via these devices. The network infrastructure may determine the routing, which may be configured to hide from the UE 1514 or from the service provider operating the host computer 1502, or both. While the OTT connection 1516 is active, the network infrastructure may further take decisions by which it dynamically changes the routing (e.g., on the basis of load balancing consideration or reconfiguration of the network).

The wireless connection 1526 between the UE 1514 and the base station 1518 is in accordance with the teachings of the embodiments described throughout this disclosure. One or more of the various embodiments improve the performance of OTT services provided to the UE 1514 using the OTT connection 1516, in which the wireless connection 1526 forms the last segment. More precisely, the teachings of these embodiments may improve, e.g., data rate, latency, and/or power consumption and thereby provide benefits such as, e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1516 between the host computer 1502 and the UE 1514, in response to variations in the measurement results. The measurement procedure and/or the network functionality for reconfiguring the OTT connection 1516 may be implemented in the software 1510 and the hardware 1504 of the host computer 1502 or in the software 1540 and the hardware 1534 of the UE 1514, or both. In some embodiments, sensors (not shown) may be deployed in or in association with communication devices through which the OTT connection 1516 passes; the sensors may participate in the measurement procedure by supplying values of the monitored quantities exemplified above, or supplying values of other physical quantities from which the software 1510, 1540 may compute or estimate the monitored quantities. The reconfiguring of the OTT connection 1516 may include message format, retransmission settings, preferred routing, etc.; the reconfiguring need not affect the base station 1514, and it may be unknown or imperceptible to the base station 1514. Such procedures and functionalities may be known and practiced in the art. In certain embodiments, measurements may involve proprietary UE signaling facilitating the host computer 1502's measurements of throughput, propagation times, latency, and the like. The measurements may be implemented in that the software 1510 and 1540 causes messages to be transmitted, in particular empty or 'dummy' messages, using the OTT connection 1516 while it monitors propagation times, errors, etc.

Figures 16, 17:
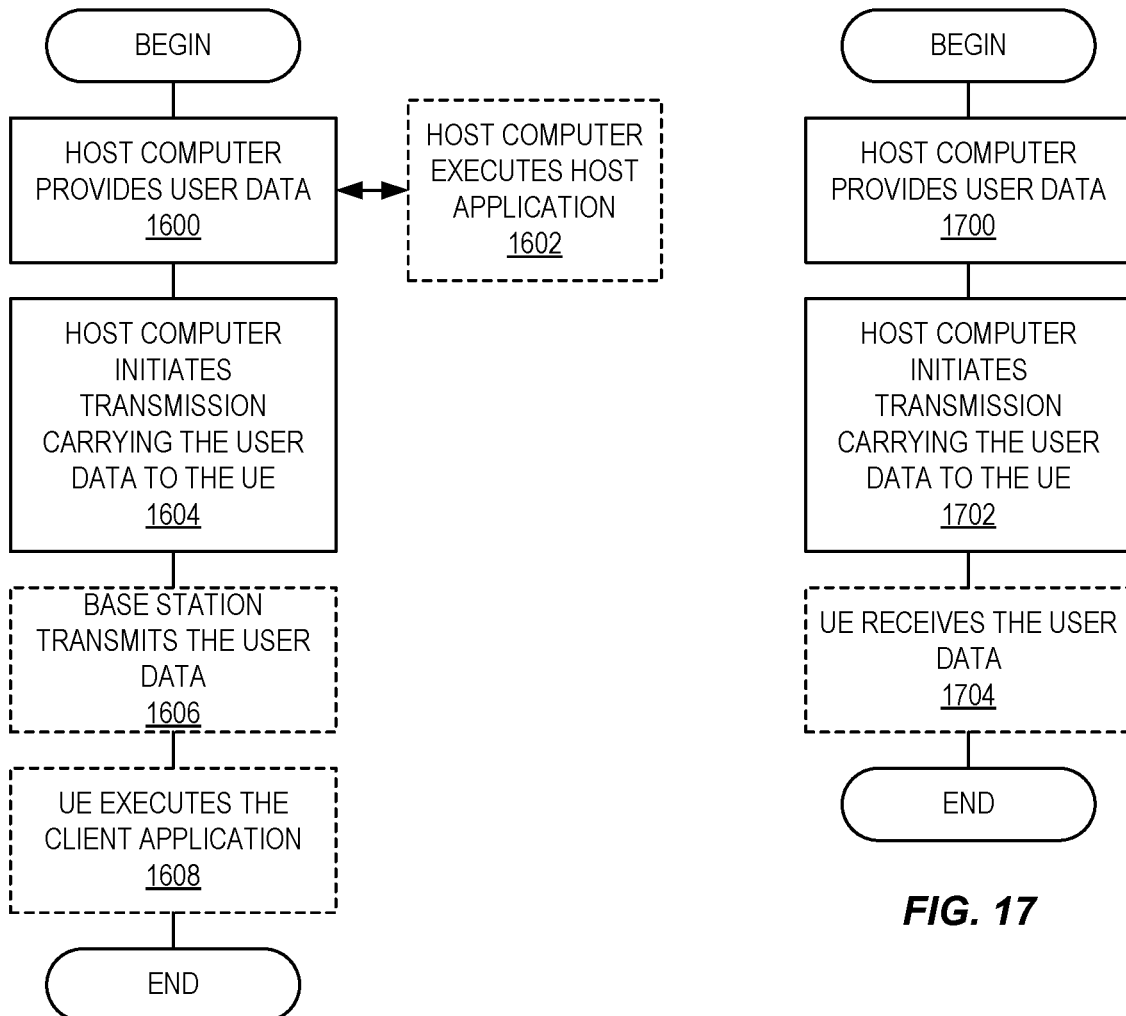

FIG. 16 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 16 will be included in this section. In step 1600, the host computer provides user data. In sub-step 1602 (which may be optional) of step 1600, the host computer provides the user data by executing a host application. In step 1604, the host computer initiates a transmission carrying the user data to the UE. In step 1606 (which may be optional), the base station transmits to the UE the user data which was carried in the transmission that the host computer initiated, in accordance with the teachings of the embodiments described throughout this disclosure. In step 1608 (which may also be optional), the UE executes a client application associated with the host application executed by the host computer.

FIG. 17 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 17 will be included in this section. In step 1700 of the method, the host computer provides user data. In an optional sub-step (not shown) the host computer provides the user data by executing a host application. In step 1702, the host computer initiates a transmission carrying the user data to the UE. The transmission may pass via the base station, in accordance with the teachings of the embodiments described throughout this disclosure. In step 1704 (which may be optional), the UE receives the user data carried in the transmission.

FIG. 18 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 18 will be included in this section. In step 1800 (which may be optional), the UE receives input data provided by the host computer. Additionally or alternatively, in step 1802, the UE provides user data. In sub-step 1804 (which may be optional) of step 1800, the UE provides the user data by executing a client application. In sub-step 1806 (which may be optional) of step 1802, the UE executes a client application which provides the user data in reaction to the received input data provided by the host computer. In providing the user data, the executed client application may further consider user input received from the user. Regardless of the specific manner in which the user data was provided, the UE initiates, in sub-step 1808 (which may be optional), transmission of the user data to the host computer. In step 1810 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 19 will be included in this section. In step 1900 (which may be optional), in accordance with the teachings of the embodiments described throughout this disclosure, the base station receives user data from the UE. In step 1902 (which may be optional), the base station initiates transmission of the received user data to the host computer. In step 1904 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are:

Group A Embodiments

Embodiment 1: A method of operation of a radio node (e.g., a User Equipment device, UE, (112) or base station (102, 106)) for providing sub-Physical Resource Block, PRB, transmission, comprising: selecting two adjacent subcarriers from a set of three allocated subcarriers that are allocated for a sub-PRB transmission that uses Single Carrier Frequency Division Multiple Access, SC-FDMA, Pi/2 Binary Phase Shift Keying, BPSK, modulation using only two adjacent subcarriers out of the set of three allocated subcarriers with Discrete Fourier Transform, DFT, spread length of 2.

Embodiment 2: The method of embodiment 1 further comprising performing one or more tasks using the sub-PRB transmission.

Embodiment 3: The method of embodiment 2 wherein performing the one or more tasks comprises performing the sub-PRB transmission using SC-FDMA Pi/2 BPSK modulation using only the two selected adjacent subcarriers out of the set of three allocated subcarriers with DFT-spread length of 2.

Embodiment 4: The method of embedment 2 wherein performing the one or more tasks comprises sending information that indicates the two selected adjacent subcarriers to another node.

Embodiment 5: The method of any one of embodiments 1 to 4 wherein selecting the two adjacent subcarriers from the set of three allocated subcarriers comprises selecting the two adjacent subcarriers based on whether a cell that has allocated the sub-PRB transmission is either "even" or "odd."

Embodiment 6: The method of any one of embodiments 1 to 4 wherein selecting the two adjacent subcarriers from the set of three allocated subcarriers comprises selecting the two adjacent subcarriers based on a cell Identifier, ID, of a cell that has allocated the sub-PRB transmission.

Embodiment 7: The method of any one of embodiments 1 to 4 wherein selecting the two adjacent subcarriers from the set of three allocated subcarriers comprises selecting the two adjacent subcarriers randomly per cell.

Embodiment 8: The method of any one of embodiments 1 to 7 wherein Demodulation Reference Signal, DMRS, is mapped to only one of the two selected adjacent subcarriers in a predefined manner.

Embodiment 9: The method of embodiment 8 wherein the one of the two selected adjacent subcarriers to which DMRS is mapped is a center subcarrier of the set of three allocated subcarriers.

Embodiment 10: The method of embodiment 8 further comprising selecting the one of the two selected adjacent subcarriers to which DMRS is mapped based on whether a cell that has allocated the sub-PRB transmission is either "even" or "odd."

Embodiment 11: The method of embodiment 8 further comprising selecting the one of the two selected adjacent subcarriers to which DMRS is mapped based on whether a cell that has allocated the sub-PRB transmission is either "even" or "odd."

Embodiment 12: The method of any one of embodiments 1 to 7 wherein Demodulation Reference Signal, DMRS, is mapped to the two selected adjacent subcarriers in a predefined manner.

Embodiment 13: The method of any one of embodiments 1 to 7 wherein Demodulation Reference Signal, DMRS, is mapped to the two selected adjacent subcarriers in accordance with a predefined pattern.

Embodiment 14: The method of embodiment 13 wherein the predefined pattern is a periodic pattern that alternates the DMRS mapping among the two selected adjacent subcarriers.

Embodiment 15: The method of embodiment 13 wherein the predefined pattern is a pseudorandom pattern that alternates the DMRS mapping among the two selected adjacent subcarriers.

Embodiment 16: A method of operation of a radio node (e.g., a User Equipment device, UE, (112) or base station (102, 106)) to provide sub-Physical Resource Block, PRB, transmission, comprising: selecting a number $N_S$ of adjacent subcarriers from a set of $N_A$ allocated subcarriers that are allocated for a sub-PRB transmission that uses a modulation using only $N_S$ adjacent subcarriers out of the set of $N_A$ allocated subcarriers where $N_S < N_A$.

Embodiment 17: The method of embodiment 16 further comprising performing one or more tasks using the sub-PRB transmission.

Embodiment 18: The method of embodiment 17 wherein performing the one or more tasks comprises performing the sub-PRB transmission using the modulation using only the $N_S$ selected adjacent subcarriers out of the set of $N_A$ allocated subcarriers.

Embodiment 19: The method of embedment 17 wherein performing the one or more tasks comprises sending information that indicates the $N_S$ selected adjacent subcarriers to another node.

Embodiment 20: The method of any one of embodiments 16 to 19 wherein selecting the $N_S$ adjacent subcarriers from the set of $N_A$ allocated subcarriers comprises selecting the $N_S$ adjacent subcarriers based on whether a cell that has allocated the sub-PRB transmission is either "even" or "odd."

Embodiment 21: The method of any one of embodiments 16 to 19 wherein selecting the $N_S$ adjacent subcarriers from the set of $N_A$ allocated subcarriers comprises selecting the $N_S$ adjacent subcarriers based on a cell Identifier, ID, of a cell that has allocated the sub-PRB transmission.

Embodiment 22: The method of any one of embodiments 16 to 19 wherein selecting the $N_S$ adjacent subcarriers from the set of $N_A$ allocated subcarriers comprises selecting the $N_S$ adjacent subcarriers randomly per cell.

Embodiment 23: The method of any one of embodiments 16 to 22 wherein Demodulation Reference Signal, DMRS, is mapped to only a subset of (e.g., one of) the $N_S$ selected adjacent subcarriers in a predefined manner.

Embodiment 24: The method of embodiment 23 wherein the subset of the $N_S$ selected adjacent subcarriers to which DMRS is mapped comprises a center subcarrier of the set of $N_A$ allocated subcarriers.

Embodiment 25: The method of embodiment 23 further comprising selecting the subset of the $N_S$ selected adjacent subcarriers to which DMRS is mapped based on whether a cell that has allocated the sub-PRB transmission is either "even" or "odd."

Embodiment 26: The method of embodiment 23 further comprising selecting the subset of the $N_S$ selected adjacent subcarriers to which DMRS is mapped based on whether a cell that has allocated the sub-PRB transmission is either "even" or "odd."

Embodiment 27: The method of any one of embodiments 16 to 22 wherein Demodulation Reference Signal, DMRS, is mapped to the $N_S$ selected adjacent subcarriers in a predefined manner.

Embodiment 28: The method of any one of embodiments 16 to 22 wherein Demodulation Reference Signal, DMRS, is mapped to two selected adjacent subcarriers in accordance with a predefined pattern.

Embodiment 29: The method of embodiment 28 wherein the predefined pattern is a periodic pattern that alternates the DMRS mapping among the $N_S$ selected adjacent subcarriers.

Embodiment 30: The method of embodiment 28 wherein the predefined pattern is a pseudorandom pattern that alternates the DMRS mapping among the $N_S$ selected adjacent subcarriers.

Embodiment 31: The method of any one of embodiments 16 to 30 wherein the modulation using only $N_S$ adjacent subcarriers out of the set of $N_A$ allocated subcarriers is Single Carrier Frequency Division Multiple Access, SC-FDMA, Pi/2 Binary Phase Shift Keying, BPSK, modulation using only two adjacent subcarriers out of the set of $N_A$ allocated subcarriers with Discrete Fourier Transform, DFT, spread length of 2 such that $N_A=3$ and $N_S=2$.

Embodiment 32: The method of any one of embodiments 1 to 31 wherein the radio node is a wireless device.

Embodiment 33: The method of embodiment 32, further comprising: providing user data; and forwarding the user data to a host computer via a transmission to the base station.

Embodiment 34: The method of any one of embodiments 1 to 31 wherein the radio node is a base station.

Embodiment 35: The method of any of the previous embodiments, further comprising: obtaining user data; and forwarding the user data to a host computer or a wireless device.

Group C Embodiments

Embodiment 36: A wireless device for providing sub-Physical Resource Block, PRB, transmission, the wireless device comprising: processing circuitry configured to perform any of the steps of any of embodiments 1-33; and power supply circuitry configured to supply power to the wireless device.

Embodiment 37: A base station for providing sub-Physical Resource Block, PRB, transmission, the base station comprising: processing circuitry configured to perform any of the steps of any of embodiments 1-31, 34, and 35; and power supply circuitry configured to supply power to the base station.

Embodiment 38: A User Equipment, UE, (1200) for providing sub-Physical Resource Block, PRB, transmission, the UE (1200) comprising: an antenna (1212) configured to send and receive wireless signals; radio front-end circuitry connected to the antenna (1212) and to processing circuitry (1202), and configured to condition signals communicated between the antenna (1212) and the processing circuitry (1202); the processing circuitry (1202) being configured to perform any of the steps of any of embodiments 1-33; an input interface connected to the processing circuitry (1202) and configured to allow input of information into the UE (1200) to be processed by the processing circuitry (1202); an output interface connected to the processing circuitry (1202) and configured to output information from the UE (1200) that has been processed by the processing circuitry (1202); and a battery connected to the processing circuitry (1202) and configured to supply power to the UE (1200).

Embodiment 39: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of embodiments 1-31, 34, and 35.

Embodiment 40: The communication system of the previous embodiment further including the base station.

Embodiment 41: The communication system of the previous 2 embodiments, further including the UE, wherein the UE is configured to communicate with the base station.

Embodiment 42: The communication system of the previous 3 embodiments, wherein: the processing circuitry of the host computer is configured to execute a host application, thereby providing the user data; and the UE comprises processing circuitry configured to execute a client application associated with the host application.

Embodiment 43: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of embodiments 1-31, 34, and 35.

Embodiment 44: The method of the previous embodiment, further comprising, at the base station, transmitting the user data.

Embodiment 45: The method of the previous 2 embodiments, wherein the user data is provided at the host computer by executing a host application, the method further comprising, at the UE, executing a client application associated with the host application.

Embodiment 46: A User Equipment, UE, configured to communicate with a base station, the UE comprising a radio interface and processing circuitry configured to perform the method of the previous 3 embodiments.

Embodiment 47: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any embodiments 1-31.

Embodiment 48: The communication system of the previous embodiment, wherein the cellular network further includes a base station configured to communicate with the UE.

Embodiment 49: The communication system of the previous 2 embodiments, wherein: the processing circuitry of the host computer is configured to execute a host application, thereby providing the user data; and the UE's processing circuitry is configured to execute a client application associated with the host application.

Embodiment 50: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of embodiments 1-31.

Embodiment 51: The method of the previous embodiment, further comprising at the UE, receiving the user data from the base station.

Embodiment 52: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of embodiments 1-31.

Embodiment 53: The communication system of the previous embodiment, further including the UE.

Embodiment 54: The communication system of the previous 2 embodiments, further including the base station, wherein the base station comprises a radio interface configured to communicate with the UE and a communication interface configured to forward to the host computer the user data carried by a transmission from the UE to the base station.

Embodiment 55: The communication system of the previous 3 embodiments, wherein: the processing circuitry of the host computer is configured to execute a host application; and the UE's processing circuitry is configured to execute a client application associated with the host application, thereby providing the user data.

Embodiment 56: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 57: A method implemented in a communication system including a host computer, a base station, and a User Equipment, UE, the method comprising: at the host computer, receiving user data transmitted to the base station from the UE, wherein the UE performs any of the steps of any of embodiments 1-31.

Embodiment 58: The method of the previous embodiment, further comprising, at the UE, providing the user data to the base station.

Embodiment 59: The method of the previous 2 embodiments, further comprising: at the UE, executing a client application, thereby providing the user data to be transmitted; and at the UE, executing a host application associated with the client application.

Embodiment 60: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 61: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group A embodiments.

Embodiment 62: The communication system of the previous embodiment further including the base station.

Embodiment 63: The communication system of the previous 2 embodiments, further including the UE, wherein the UE is configured to communicate with the base station.

Embodiment 64: The communication system of the previous 3 embodiments, wherein: the processing circuitry of the host computer is configured to execute a host application; and the UE is configured to execute a client application associated with the host application, thereby providing the user data to be received by the host computer.

Embodiment 65: A method implemented in a communication system including a host computer, a base station, and a User Equipment, UE, the method comprising: at the host computer, receiving, from the base station, user data originating from a transmission which the base station has received from the UE, wherein the UE performs any of the steps of any of embodiments 1-31.

Embodiment 66: The method of the previous embodiment, further comprising at the base station, receiving the user data from the UE.

Embodiment 67: The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AP Access Point
ASIC Application Specific Integrated Circuit
BL Bandwidth Limited Low Complexity
BPSK Binary Phase Shift Keying
CE Coverage Enhancement
CPU Central Processing Unit
DFT Discrete Fourier Transform
DMRS Demodulation Reference Signal
DSP Digital Signal Processor
efeMTC Even Further Enhanced Machine Type Communication
eNB Enhanced or Evolved Node B
FFT Fast Fourier Transform
FPGA Field Programmable Gate Array
gNB New Radio Base Station
ID Identifier
kHz Kilohertz LTE Long Term Evolution
MME Mobility Management Entity
ms Millisecond
MTC Machine Type Communication
NB-IoT Narrowband Internet of Things
NR New Radio
OTT Over-the-Top
PAPR Peak-to-Average Power Ratio
PCI Physical Cell Identifier
P-GW Packet Data Network Gateway
PRB Physical Resource Block
PUSCH Physical Uplink Shared Channel
QPSK Quadrature Phase Shift Keying
RAM Random Access Memory
RAN Radio Access Network
RE Resource Element
ROM Read Only Memory
RRH Remote Radio Head
RU Resource Unit
SCEF Service Capability Exposure Function
SC-FDMA Single Carrier Frequency Division Multiple Access
TB Transport Block
UE User Equipment
WI Work Item
WID Work Item Description

REFERENCES

[1] Huawei et al., "RP-170309: Revised WID: LTE Advanced inter-band CA Rel-14 for 3DL/1UL," 3GPP TSG RAN Meeting #75, Mar. 6-9, 2017, Dubrovnik, Croatia.
[2] Ericsson et al., "RP-171427: Revised WID on Even further enhanced MTC for LTE," 3GPP TSG RAN Meeting #76, Jun. 5-8, 2017, West Palm Beach, USA.
[3] Ad-Hoc chair (NTT DOCOMO, INC.), "R1-1721237: Chairman's notes of AI 6.2.5 even further enhanced MTC for LTE," 3GPP TSG RAN WG1 Meeting 91, November 27-Dec. 1, 2017, Reno, USA.

What is claimed is:

1. A method of operation of a radio node for providing sub-Physical Resource Block (sub-PRB) transmission, comprising:
selecting, based on a cell Identifier (ID) of a cell, two adjacent subcarriers from a set of three allocated subcarriers that are allocated for a sub-PRB transmission that uses Single Carrier Frequency Division Multiple Access (SC-FDMA) Pi/2 Binary Phase Shift Keying (BPSK) modulation using only two adjacent subcarriers out of the set of three allocated subcarriers with Discrete Fourier Transform (DFT) spread length of 2.

2. The method of claim 1, further comprising performing one or more tasks related to the sub-PRB transmission.

3. The method of claim 2, wherein performing the one or more tasks comprises performing the sub-PRB transmission using SC-FDMA Pi/2 BPSK modulation using only the two selected adjacent subcarriers out of the set of three allocated subcarriers with DFT-spread length of 2.

4. The method of claim 1, wherein selecting, based on the cell ID of the cell, the two adjacent subcarriers comprises selecting the two adjacent subcarriers based on a value resulting from the cell ID modulo 2 operation.

5. The method of claim 4, wherein the two adjacent subcarriers are two subcarriers with lowest indexes among the set of three allocated subcarriers if the value is "0" and the two adjacent subcarriers are two subcarriers with the highest indexes among the set of three allocated subcarriers if the value is "1".

6. The method of claim 1, wherein Demodulation Reference Signal (DMRS) is mapped to the two selected adjacent subcarriers in accordance with an alternating pattern.

7. The method of claim 1, wherein Demodulation Reference Signal (DMRS) is mapped to the two selected adjacent subcarriers in accordance with a deterministic alternating pattern.

8. The method of claim 1, wherein the radio node is a wireless device.

9. A radio node for providing sub-Physical Resource Block (sub-PRB) transmission, comprising:
processing circuitry configured to cause the radio node to select, based on a cell Identifier (ID) of a cell, two adjacent subcarriers from a set of three allocated subcarriers that are allocated for a sub-PRB transmission that uses Single Carrier Frequency Division Multiple Access (SC-FDMA) Pi/2 Binary Phase Shift Keying (BPSK) modulation using only two adjacent subcarriers out of the set of three allocated subcarriers with Discrete Fourier Transform (DFT) spread length of 2.

10. The radio node of claim 9 wherein the processing circuitry is further configured to perform one or more tasks related to the sub-PRB transmission.

11. The radio node of claim 10 wherein performing the one or more tasks comprises performing the sub-PRB transmission using SC-FDMA Pi/2 BPSK modulation using only the two selected adjacent subcarriers out of the set of three allocated subcarriers with DFT-spread length of 2.

12. The radio node of claim 10 wherein performing the one or more tasks comprises sending information that indicates the two selected adjacent subcarriers to another node.

13. The radio node of claim 10 wherein selecting, based on the cell ID of the cell, the two adjacent subcarriers comprises selecting the two adjacent subcarriers based on a value resulting from the cell ID modulo 2 operation.

14. The radio node of claim 13 wherein the two adjacent subcarriers are two subcarriers with lowest indexes among the set of three allocated subcarriers if the value is "0" and the two adjacent subcarriers are two subcarriers with the highest indexes among the set of three allocated subcarriers if the value is "1".

15. The radio node of claim 9 wherein Demodulation Reference Signal (DMRS) is mapped to the two selected adjacent subcarriers in accordance with an alternating pattern.

16. The radio node of claim 9 wherein Demodulation Reference Signal (DMRS) is mapped to the two selected adjacent subcarriers in accordance with a deterministic alternating pattern.

17. The radio node of claim 9 wherein selecting the two adjacent subcarriers from the set of three allocated subcarriers comprises selecting the two adjacent subcarriers based on whether a cell that has allocated the sub-PRB transmission is either "even" or "odd".

18. The radio node of claim 9 wherein selecting the two adjacent subcarriers from the set of three allocated subcarriers comprises selecting the two adjacent subcarriers randomly per cell.

19. The radio node of claim 9 wherein Demodulation Reference Signal (DMRS) is mapped to the two selected adjacent subcarriers in accordance with a predefined pattern.

20. The radio node of claim 19 wherein the predefined pattern is a periodic pattern that alternates the DMRS mapping among the two selected adjacent subcarriers.

\* \* \* \* \*

UNITED STATES PATENT AND TRADEMARK OFFICE
CERTIFICATE OF CORRECTION

PATENT NO. : 11,729,031 B2
APPLICATION NO. : 17/863465
DATED : August 15, 2023
INVENTOR(S) : Wang et al.

Page 1 of 1

It is certified that error appears in the above-identified patent and that said Letters Patent is hereby corrected as shown below:

In the Specification

In Column 3, Lines 6-11, delete "
$$0\ 0 \to \text{BPSK modulator} \to \{1;\ 1\} \to \text{N-FFT} \to \{2;\ 0\} \to \ldots$$
$$0\ 1 \to \text{BPSK modulator} \to \{1;\ -1\} \to \text{N-FFT} \to \{0;\ 2\} \to \ldots$$
$$1\ 0 \to \text{BPSK modulator} \to \{-1;\ 1\} \to \text{N-FFT} \to \{0;\ -2\} \to \ldots$$
$$1\ 1 \to \text{BPSK modulator} \to \{-1;\ -1\} \to \text{N-FFT} \to \{-2;\ 0\} \to \ldots$$
" and insert --
$$0\ 0 \to \text{BPSK modulator} \to \{1;\ 1\} \to \text{N-FFT} \to \{2;\ 0\} \to \ldots$$
$$0\ 1 \to \text{BPSK modulator} \to \{1;\ -1\} \to \text{N-FFT} \to \{0;\ 2\} \to \ldots$$
$$1\ 0 \to \text{BPSK modulator} \to \{-1;\ 1\} \to \text{N-FFT} \to \{0;\ -2\} \to \ldots$$
$$1\ 1 \to \text{BPSK modulator} \to \{-1;\ -1\} \to \text{N-FFT} \to \{-2;\ 0\} \to \ldots$$
--, therefor.

In Column 6, Line 14, delete "Generatin" and insert -- Generation --, therefor.

In Column 19, Line 51, delete "embedment" and insert -- embodiment --, therefor.

In Column 20, Line 53, delete "embedment" and insert -- embodiment --, therefor.

Signed and Sealed this
Thirtieth Day of January, 2024

Katherine Kelly Vidal
*Director of the United States Patent and Trademark Office*